US012629889B2

(12) United States Patent
Hao et al.

(10) Patent No.: US 12,629,889 B2
(45) Date of Patent: May 19, 2026

(54) 3D PRINTING WIRE AND PREPARATION METHOD THEREFOR, 3D PRINTING METHOD, AND PRINTING APPARATUS

(71) Applicant: JF POLYMERS (SUZHOU) CO., LTD., Suzhou (CN)

(72) Inventors: Mingyang Hao, Suzhou (CN); Xiaofan Luo, Suzhou (CN)

(73) Assignee: JF POLYMERS (SUZHOU) CO., LTD., Suzhou (CN)

( * ) Notice: Subject to any disclaimer, the term of this patent is extended or adjusted under 35 U.S.C. 154(b) by 91 days.

(21) Appl. No.: 18/755,740

(22) Filed: Jun. 27, 2024

(65) Prior Publication Data

US 2024/0391171 A1 Nov. 28, 2024

Related U.S. Application Data

(63) Continuation-in-part of application No. PCT/CN2022/141796, filed on Dec. 26, 2022.

(30) Foreign Application Priority Data

Dec. 29, 2021 (CN) ......................... 202111634926.2
Dec. 29, 2021 (CN) ......................... 202111637605.8
Dec. 29, 2021 (CN) ......................... 202111639207.X

(51) Int. Cl.
*B29C 64/118* (2017.01)
*B29C 64/314* (2017.01)
(Continued)

(52) U.S. Cl.
CPC .......... *B29C 64/314* (2017.08); *B29C 64/118* (2017.08); *B33Y 40/00* (2014.12); *B33Y 10/00* (2014.12); *B33Y 70/00* (2014.12)

(58) Field of Classification Search
CPC ..................................................... B29C 64/118
See application file for complete search history.

(56) References Cited

U.S. PATENT DOCUMENTS

2016/0194492 A1* 7/2016 Smith, Jr. ............. B33Y 70/10
427/430.1
2019/0030794 A1* 1/2019 Jiang ................... C09D 11/106
(Continued)

FOREIGN PATENT DOCUMENTS

CN 109293382 A 2/2019
CN 109732899 A 5/2019
(Continued)

*Primary Examiner* — Yung-Sheng M Tsui
(74) *Attorney, Agent, or Firm* — Bayramoglu Law Offices, LLC

(57) ABSTRACT

A 3D printing wire, a method for preparing the 3D printing wire, a 3D printing method, and a 3D printing apparatus are provided. The method for preparing the 3D printing wire includes: co-extruding a first polymer matrix composite and a second polymer matrix composite to produce a 3D printing wire with a core-shell structure. In the 3D printing wire with the core-shell structure, a shell structure formed by the second polymer matrix composite is wrapped around a core structure formed by the first polymer matrix composite. A filler material volume fraction of the first polymer matrix composite is larger than a filler material volume fraction of the second polymer matrix composite. The material for the shell structure includes an unfilled polymer material with a composite filling content of zero.

16 Claims, 4 Drawing Sheets

(51) Int. Cl.

| | |
|---|---|
| ***B33Y 40/00*** | (2020.01) |
| *B33Y 10/00* | (2015.01) |
| *B33Y 70/00* | (2020.01) |

(56) References Cited

U.S. PATENT DOCUMENTS

| | | | |
|---|---|---|---|
| 2020/0009786 A1 | 1/2020 | Hikmet et al. | |
| 2020/0131364 A1* | 4/2020 | Luo | B29C 64/40 |
| 2020/0298467 A1 | 9/2020 | Cakmak et al. | |
| 2020/0407882 A1 | 12/2020 | Kopping et al. | |
| 2021/0197444 A1 | 7/2021 | Van Hal, V et al. | |
| 2021/0387422 A1 | 12/2021 | Liu | |
| 2023/0089703 A1* | 3/2023 | Kalish | C08J 9/10 |

FOREIGN PATENT DOCUMENTS

| | | |
|---|---|---|
| CN | 112144146 A | 12/2020 |
| CN | 115141481 A | 10/2022 |
| CN | 115449215 A | 12/2022 |

* cited by examiner

3D PRINTING WIRE AND PREPARATION METHOD THEREFOR, 3D PRINTING METHOD, AND PRINTING APPARATUS

CROSS REFERENCE TO THE RELATED APPLICATIONS

This application is the continuation-in-part application of International Application No. PCT/CN2022/141796, filed on Dec. 26, 2022, which is based upon and claims priority to Chinese Patent Applications No. 202111634926.2, No. 202111637605.8, and No. 202111639207.X, all filed on Dec. 29, 2021, the entire contents of which are incorporated herein by reference.

TECHNICAL FIELD

The present application relates to the technical field of 3D printing, and in particular to a 3D printing wire, a method for preparing the 3D printing wire, a 3D printing method, a 3D printing apparatus, and a 3D-printed object.

BACKGROUND

Melt blending-based modification has become the mainstream modification technology for polymer materials of extrusion 3D printing. A technical principle of melt blending-based modification is as follows: a plurality of materials are subjected to melt blending at a specified temperature, such that a blended composite with a multi-phase structure is prepared under the combined action of a specified external force field and temperature field. A core idea of this technology is to prepare a composite from a plurality of materials with different properties that make up for each other's deficiencies.

However, application of the existing melt blending-based modification technology in the technical field of extrusion 3D printing is still faced with some common problems, such as weakening of bonding between printed layers caused by a dispersed multi-phase structure in a wire when the existing melt blending-based modification technology is used for extrusion 3D printing. There are often contradictions between printability and end-use of a material, which cannot be deeply optimized by general modification technology. A polymer material with high rigidity will make a wire have very high brittleness at a high composite filling content, which is not conducive to use or the like.

Therefore, how to improve the decline of an interlayer bonding strength of a composite filling wire, especially the significant weakening of interlayer bonding at a high filling content, has become a technical problem to be solved by practitioners in the field.

SUMMARY

[005 Case]

In view of the shortcomings of the above-mentioned related technologies, an objective of the present application is to provide a 3D printing wire, a method for preparing the 3D printing wire, a 3D printing method, a 3D printing apparatus, and a 3D-printed object, so as to avoid the decline of an interlayer bonding strength of a composite filling wire, especially the significant weakening of interlayer bonding at a high filling content in the prior art.

In order to allow the above objective and other related objectives, a first aspect of the present application provides a 3D printing wire, including: a core structure and a shell structure wrapped around the core structure, where the core structure includes a first polymer matrix composite and the shell structure includes a second polymer matrix composite.

A second aspect of the present application also provides a method for preparing a 3D printing wire, including the following step: co-extruding a first polymer matrix composite and a second polymer matrix composite to produce the 3D printing wire with a core-shell structure, where in the 3D printing wire with the core-shell structure, a shell structure formed by the second polymer matrix composite is wrapped around a core structure formed by the first polymer matrix composite.

In the 3D printing wire described in the first aspect and the method for preparing a 3D printing wire described in the second aspect of the present application, the 3D printing wire with the core-shell structure is produced by co-extruding a first polymer matrix composite and a second polymer matrix composite, where in the 3D printing wire with the core-shell structure, a shell structure formed by the second polymer matrix composite is wrapped around a core structure formed by the first polymer matrix composite. The first polymer matrix composite and the second polymer matrix composite both are a polymer matrix composite, and a filler material volume fraction of the first polymer matrix composite is larger than a filler material volume fraction of the second polymer matrix composite. The 3D printing composite wire prepared accordingly allows a strong bonding strength between different layers during printing, and the 3D printing wire of the present application allows a significantly-stronger interlayer bonding strength than the core layer material used alone, which avoids the decline of an interlayer bonding strength of a composite filling wire and the significant weakening of interlayer bonding at a high filling content in the prior art.

[004 Case]

In order to solve the technical pain points such as material compounding and molding and post-treating faced when a single material is adopted for printing under the existing technical framework, a third aspect of the present application provides a 3D printing wire, including: a core structure including a first polymer material and a shell structure that includes a second polymer material and is wrapped around the core structure, where a glass transition temperature ($T_g$) value of the first polymer material is different from a $T_g$ value of the second polymer material.

A fourth aspect of the present application also provides a method for preparing a 3D printing wire, including the following step: co-extruding a first polymer material and a second polymer material to produce a 3D printing wire with a core-shell structure, where in the 3D printing wire with the core-shell structure, a shell structure formed by the second polymer material is wrapped around a core structure formed by the first polymer material, and a $T_g$ value of the first polymer material is different from a $T_g$ value of the second polymer material.

In the 3D printing wire described in the third aspect and the method for preparing a 3D printing wire described in the fourth aspect of the present application, a 3D printing wire with a core-shell structure is produced by co-extruding a first polymer material and a second polymer material, and in the 3D printing wire with the core-shell structure, a shell structure formed by the second polymer material is wrapped around a core structure formed by the first polymer material. A $T_g$ value of the core structure including the first polymer material is different from a $T_g$ value of the shell structure including the second polymer material, which can effectively improve the warpage in printing with a high-$T_g$ material while maintaining or even improving the interlayer bonding of a printed object. In the present application, a wire with a continuous multi-layer structure is prepared through the melting and multi-layer co-extrusion of a plurality of materials, so as to allow a continuous multi-phase morphological structure in a printed object.

[006 Case]

In order to solve the technical problem that a printing efficiency is often affected by the blockage of a printhead or the non-smooth printing caused by the failed smooth extrusion due to weak rigidity of the entire wire and the slippage of a fed wire due to strong surface rigidity of a wire in the prior art, a fifth aspect of the present application provides a 3D printing wire, including: a core structure and a shell structure wrapped around the core structure, where the core structure includes a first polymer material and the shell structure includes a second polymer material, and a tensile elastic modulus of the first polymer material is different from a tensile elastic modulus of the second polymer material.

A sixth aspect of the present application also provides a method for preparing a 3D printing wire, including the following step: co-extruding a first polymer material and a second polymer material to produce a 3D printing wire with a core-shell structure, where in the 3D printing wire with the core-shell structure, a shell structure formed by the second polymer material is wrapped around a core structure formed by the first polymer material, and a tensile elastic modulus of the first polymer material is different from a tensile elastic modulus of the second polymer material.

In the 3D printing wire described in the fifth aspect and the method for preparing a 3D printing wire described in the sixth aspect of the present application, the 3D printing wire with the core-shell structure is produced by co-extruding a first polymer material and a second polymer material, and in the 3D printing wire with the core-shell structure, a shell structure formed by the second polymer material is wrapped around a core structure formed by the first polymer material. A tensile elastic modulus of the first polymer material is different from or greater than a tensile elastic modulus of the second polymer material, which effectively improves the overall rigidity of the wire without reducing the surface hardness of the wire, namely, improving the overall rigidity of the wire. As a result, the extrusion conveyability of the soft elastomer material during a printing process is improved and the slippage of a fed wire is avoided, such that the convey of the wire by a printhead during 3D printing is smooth, which is conducive to improving a printing efficiency.

A seventh aspect of the present application provides a 3D printing method used for a 3D printing apparatus. The 3D printing method includes the following steps: reading printing data, where the printing data includes a data command corresponding to at least one cross-sectional layer; controlling a printhead device of the printing apparatus to heat a 3D printing wire to 150° C. to 400° C. and extrude the printing material to a printing surface along a printing path according to the cross-sectional layer to obtain a printed and cured layer, where the 3D printing wire is the 3D printing wire described in the first aspect or the third aspect or the fifth aspect; and according to a number of the cross-sectional layers, repeating the step of controlling the printhead device to extrude the printing material to the printing surface along the printing path according to the cross-sectional layer to obtain the printed and cured layer, such that printed and cured layers are accumulated layer by layer to obtain a printed object.

An eighth aspect of the present application provides a 3D printing apparatus, including: a printing platform configured for attaching to a printed object; a driving device including a Z-axis driving mechanism that can rise and fall relative to the printing platform, and an X-axis driving mechanism and a Y-axis driving mechanism that are arranged on the Z-axis driving mechanism; a printhead device arranged on the X-axis driving mechanism or the Y-axis driving mechanism and configured to heat an introduced 3D printing wire to 150° C. to 400° C. for melting and then extrude a resulting melt to the printing platform along a printing path, where the 3D printing wire is the 3D printing wire described in the first aspect or the third aspect or the fifth aspect; and a control device electrically connected to the driving device and the printhead device and configured to control the driving device and the printhead device to implement a printing task of each layer along a printing path according to 3D printing data read, so as to allow layer-by-layer accumulation on the printing platform to obtain a printed object.

A ninth aspect of the present application provides a 3D-printed object, which refers to an object printed by the 3D printing method described in the seventh aspect.

BRIEF DESCRIPTION OF THE DRAWINGS

The specific invention features involved in the present application are shown in the appended claims. The invention features and advantages involved in the present application can be well understood with reference to the exemplary embodiments and accompanying drawings described in detail below. The accompanying drawings are briefly described as follows:

DETAILED DESCRIPTION OF THE EMBODIMENTS

Figure 1:
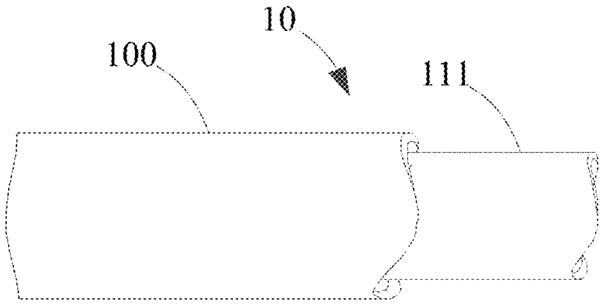
FIG. 1 is a schematic structural diagram of the 3D printing wire of the present application.

The implementations of the present application are illustrated below through specific embodiments, and those skilled in the art can easily understand other advantages and effects of the present application according to the contents disclosed in this specification.

In the following description, several embodiments of the present application are described with reference to the accompanying drawings. It should be understood that other embodiments may also be adopted and changes in mechanical compositions, structures, electrical systems, and operations may be made without departing from the spirit and scope of the present disclosure. The detailed description below should not be considered as restrictive, and the scope of the embodiments of the present application is defined only by the claims of the published patent. The terms used herein are intended to merely describe specific embodiments rather than limit the present application. Space-associated terms, such as “upper”, “lower”, “left”, “right”, “below”, “under”, “bottom”, “top”, and “above”, can be used in the text to illustrate a relationship of one component or feature with another component or feature shown in the accompanying drawings.

Although the terms “first”, “second”, or the like are used herein to describe various components or parameters in some instances, these components or parameters should not be limited by these terms. These terms are used merely to distinguish one component or parameter from another component or parameter. For example, a first polymer matrix composite may be referred to as a second polymer matrix composite, and similarly, a second polymer matrix composite may be referred to as a first polymer matrix composite, which does not depart from a scope of the various embodiments described. The first polymer matrix composite and the second polymer matrix composite both describe a composite, but the first polymer matrix composite and the second polymer matrix composite may not be the same composite when it is explicitly specified in other way in the context.

Further, as used herein, the singular forms “an”, “a”, and “the” are intended to include a plural form, unless otherwise indicated contrarily in the context. It should be further understood that the terms “includes” and “comprises” indicate the presence of the described features, steps, operations, components, assemblies, items, types, and/or groups, but do not exclude the presence, occurrence, or addition of one or more other features, steps, operations, components, assemblies, items, types, and/or groups. The terms “or” and “and/or” used herein are construed as inclusive, or imply any one or any combination. Thus, “A, B, or C” or “A, B, and/or C” means any of the following: A; B; C; A and B; A and C; B and C; and A, B, and C. There is an exception to this definition only when a combination of components, functions, steps, or operations is inherently exclusive to each other in some way.

A polymer material has a macromolecular long-chain structure, and during a melt hot molding process, the evolution of entangled and condensed structures of macromolecular chains causes a change of an internal stress of a material/object. During a melt-extrusion 3D printing molding process, the continuous accumulation of an internal stress of a material will cause the warpage of a printed object, resulting in failed printing. This technical pain point is particularly prominent for high-$T_g$ and high-crystallinity polymer materials, and a printing process for these materials has a large difficulty and a high threshold and requires a high printing apparatus cost. The existing technical route is to conduct melt blending and compounding-based modification for the molding processability and end-use performance of a polymer material. However, this technical route cannot completely solve the problem of printability of a material, and still has many pain points.

In the present application, the term “3D printing” generally refers to additive manufacturing, which can refer to any process of printing a 3D object. The 3D printing can be a constantly-additive molding technology. For example, in the 3D printing, based on a digital model file, a bondable material such as a powdery metal or plastic can be used to construct an object through layer-by-layer printing. In the present application, the 3D printing may be material-extrusion 3D printing. The material-extrusion 3D printing can refer to a fused-deposition-modelling (FDM) method. The FDM method can be used for the printing of a hot-melt polymer material (such as polylactic acid (PLA)). A 3D printing apparatus based on FDM is an FDM apparatus, which lays a filament material layer by layer according to a preset printing path.

The FDM apparatus adopts a fused deposition process. The fused deposition process is also called FDM in which a material is added in a form of a high-temperature fluid, then extruded, and cooled. During a printing process, a material is gradually added in a molten state or is kept in a molten state through a moving heat source (such as a heating component), and then cooled on a continuously-evolving surface.

In the present application, the term “wire” generally refers to a finished material with a small cross-sectional diameter and a large length. For example, a cross section of the wire may be circular, square, or oval.

In the present application, the term “melt blending” generally refers to the blending of components by a mixing apparatus at a temperature higher than viscous flow temperatures of the components to produce a homogeneous eutectic. In the present application, after the melt blending, the steps of cooling, crushing, and/or granulating may be conducted.

In the present application, the term “granular material” generally refers to a finished granular material prepared from a powdery polymer by a granulation apparatus. In the present application, an average particle size of the granular material may be 1 mm to 5 mm (such as 1 mm to 5 mm, 1.2 mm to 5 mm, 1.5 mm to 5 mm, 1.8 mm to 5 mm, 2 mm to 5 mm, 2.5 mm to 5 mm, 3 mm to 5 mm, 3.5 mm to 5 mm, 4 mm to 5 mm, or 4.5 mm to 5 mm).

In the present application, the term “includes” generally refers to the inclusion of clearly-designated features, but does not exclude other elements.

In the present application, the term “about” generally refers to a fluctuation in a range of 0.5% to 10% higher or lower than a specified value, such as a fluctuation in a range of 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% higher or lower than the specified value.

In the present application, the blending may include melt blending with a screw extruder.

In the present application, the 3D printing may be material-extrusion 3D printing.

[005 Case]

A first aspect of the present application provides a 3D printing wire. The 3D printing wire can be used in a 3D printing apparatus based on FDM, namely, an FDM apparatus, such that the 3D printing wire of the present application is laid layer by layer along a preset printing path to allow 3D printing to obtain a 3D object. FIG. 1 is a schematic structural diagram of the 3D printing wire of the present application. As shown in this figure, the 3D printing wire includes core structure 100 and shell structure 111 wrapped around the core structure 100. The core structure 100 includes a first polymer matrix composite and the shell structure 111 includes a second polymer matrix composite.

In the present application, a composite in the first polymer matrix composite or the second polymer matrix composite refers to a material with a multi-phase composite structure that is prepared from two or more different materials through a specific mixing process.

In the present application, a polymer matrix composite in the first polymer matrix composite or the second polymer matrix composite refers to a composite prepared by introducing a solid additive into a polymer material as a matrix through a specific mixing process, where the solid additive has a different composition and structure from the matrix material and the solid additive is called a filler material. The polymer matrix material can be either a thermosetting polymer material or a thermoplastic polymer material. In some embodiments, there are various diversified types of the filler material, and the filler material includes various organic and inorganic substances, including a fiber material, an inorganic powder, an organic compound, a metal compound, or the like. According to functions of filler materials, the filler materials can be divided into reinforcing fillers, electrically-conductive fillers, thermally-conductive fillers, flame-retardant fillers, low-cost fillers, or the like. A volume fraction of a filler material in a polymer matrix composite is used to evaluate a content of the filler material in the composite, and is called a filler material volume fraction of the polymer matrix composite.

In some embodiments of the present application, a filler material volume fraction of the first polymer matrix composite is higher than a filler material volume fraction of the second polymer matrix composite.

In some other embodiments of the present application, the shell structure 111 includes an unfilled polymer material with a filler material volume fraction of zero.

In an embodiment, the first polymer matrix composite or the second polymer matrix composite is a thermoplastic polymer matrix composite, and specifically, a matrix material of the first polymer matrix composite or the second polymer matrix composite is a thermoplastic polymer. The thermoplastic polymer is, for example, a thermoplastic polymer matrix composite such as polyolefin, polyamide (PA), polyester, polycarbonate (PC), polyoxymethylene (POM), polyphenylene ether (PPE), polyphenylene sulfide (PPS), polyetheretherketone (PEEK), or a liquid crystal polymer (LCP).

In some embodiments, matrix materials of the first polymer matrix composite and the second polymer matrix composite may be the same or different.

In some embodiments, a volume fraction of the first polymer matrix composite in the entire 3D printing wire is in a range of 10% to 90% (such as 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%).

In some embodiments, a $T_g$ value of the first polymer matrix composite or the second polymer matrix composite is in a range of −50° C. to 380° C. (such as −50° C. to 380° C., −40° C. to 380° C., −30° C. to 380° C., −20° C. to 380° C., −10° C. to 380° C., 0° C. to 380° C., 10° C. to 380° C., 20° C. to 380° C., 30° C. to 380° C., 40° C. to 380° C., 50° C. to 380° C., 60° C. to 380° C., 70° C. to 380° C., 80° C. to 380° C., 90° C. to 380° C., 100° C. to 380° C., 110° C. to 380° C., 120° C. to 380° C., 130° C. to 380° C., 140° C. to 380° C., 150° C. to 380° C., 160° C. to 380° C., 170° C. to 380° C., 180° C. to 380° C., 190° C. to 380° C., 200° C. to 380° C., 210° C. to 380° C., 220° C. to 380° C., 230° C. to 380° C., 240° C. to 380° C., 250° C. to 380° C., 260° C. to 380° C., 270° C. to 380° C., 280° C. to 380° C., 290° C. to 380° C., 300° C. to 380° C., 310° C. to 380° C., 320° C. to 380° C., 330° C. to 380° C., 340° C. to 380° C., 350° C. to 380° C., 360° C. to 380° C., or 370° C. to 380° C.).

In some embodiments, the filler material volume fraction of the first polymer matrix composite includes 3 vol % to 60 vol % (such as 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In some embodiments, the filler material volume fraction of the second polymer matrix composite includes 0 vol % to 20 vol % (such as 0 vol %, 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, or 20 vol %).

In some embodiments, a difference between the filler material volume fraction of the first polymer matrix composite and the filler material volume fraction of the second polymer matrix composite is in a range of 1 vol % to 60 vol % (such as 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In the present application, the filler material volume fraction of the first polymer matrix composite is larger (higher) than the filler material volume fraction of the second polymer matrix composite. It should be understood that the expression that the filler material volume fraction is large or small is a relative concept, and it can also be expressed that the filler material volume fraction of the first polymer matrix composite is higher than the filler material volume fraction of the second polymer matrix composite. For example, in some embodiments, a difference between the filler material volume fraction of the first polymer matrix composite and the filler material volume fraction of the second polymer matrix composite is in a range of 1 vol % to 60 vol % (such as 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In some embodiments, the first polymer matrix composite or the second polymer matrix composite is a thermoplastic polymer matrix composite.

In an embodiment, the matrix material of the first polymer matrix composite or the second polymer matrix composite includes a polyolefin or a copolymer of a polyolefin. The polyolefin is a polymer compound produced through addition polymerization of olefins. Such an organic polymer is typically produced through polymerization of many simple olefin molecules (α-olefins such as ethylene, propylene, 1-butene, 1-pentene, 1-hexene, 1-octene, and 4-methyl-1-pentene, and some cyclic olefins) that are the same or different. Common polyolefins include polyethylene (PE), poly (1-butene), or the like. The polyolefin is mainly produced through high-pressure polymerization, low-pressure polymerization (including a solution method, a slurry method, a bulk method, and a gas phase method), or the like. Common thermoplastic polyolefins include: PE, polypropylene (PP), polymethylpentene (PMP), polybutene-1 (PB-1), or the like; and polyolefin elastomers (POEs): polyisobutylene (PIB), ethylene-propylene rubber (EPR), ethylene propylene diene monomer (EPDM), or the like. In some embodiments of the present application, a polyolefin material refers to a material in which a polymer prepared through polymerization or copolymerization of one or more olefins serves as a matrix.

In an embodiment, the matrix material of the first polymer matrix composite or the second polymer matrix composite includes PA or a copolymer of PA. The PA is a polymer synthesized by polymerization of a monomer including carboxyl and amino through amide bonds. In some embodiments, the PA is commonly known as nylon. Nylon usually refers to a condensation polymer in which constituent units may be linked through amides. For example, in the present application, the nylon may be one or more selected from the group consisting of the following: nylon 6, a nylon 6 elastomer, nylon 66, a binary nylon 66/6 copolymer, nylon 11, a nylon 11 elastomer, nylon 12, a nylon 12 elastomer, nylon 1010, nylon 1012, and nylon 610. The nylon 6 elastomer is a block copolymer with nylon 6 as a hard segment and a polyether or polyester as a soft segment. The nylon 11 elastomer is a block copolymer with nylon 11 as a hard segment and a polyether or polyester as a soft segment. The nylon 12 elastomer is a block copolymer with nylon 12 as a hard segment and a polyether or polyester as a soft segment. For example, the nylon 6 has the following chemical structure:

Nylon 6

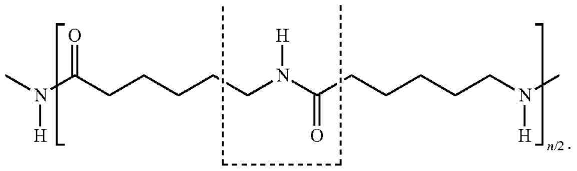

The nylon 66 has the following chemical structure:

Nylon 6-6

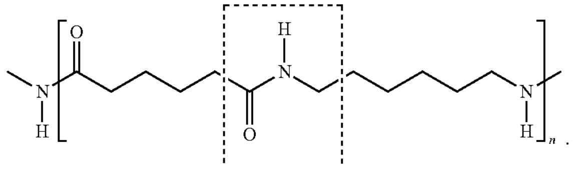

The nylon 12 (polydodecalactam) has the following chemical structure:—$[NH—(CH_2)_{11}—CO]_n$]—.

In an embodiment, the matrix material of the first polymer matrix composite or the second polymer matrix composite includes a polyester or a copolymer of a polyester. The polyester is a general term for polymers produced through polycondensation of polyols and polyacids. The polyester mainly refers to polyethylene terephthalate (PET), and customarily also includes linear thermoplastic resins such as polybutylene terephthalate (PBT) and polyarylester.

In an embodiment, the matrix material of the first polymer matrix composite or the second polymer matrix composite is PC or a copolymer of PC. The PC, also known as PC plastic, is a polymer with a carbonate group in a molecular chain. According to structures of ester groups, the PC can include aliphatic PC, aromatic PC, aliphatic-aromatic PC, or the like.

In an embodiment, the matrix material of the first polymer matrix composite or the second polymer matrix composite includes POM or a copolymer of POM. The POM, also known as acetal resin, polyformaldehyde, or polyacetal, is a thermoplastic crystalline polymer.

In an embodiment, the matrix material of the first polymer matrix composite or the second polymer matrix composite includes PPE or a copolymer of PPE. The PPE is a high-temperature thermoplastic, and is also known as polyphenylene oxide (PPO). The PPO is an amorphous thermoplastic polymer.

In an embodiment, the matrix material of the first polymer matrix composite or the second polymer matrix composite includes PPS or a copolymer of PPS. The PPS is a polymer molecule including p-phenylene sulfide repeating structural units.

In an embodiment, the matrix material of the first polymer matrix composite or the second polymer matrix composite includes PEEK or a copolymer of PEEK. The PEEK is a linear aromatic polymer compound consisting of oxy-p-phenylene-carbonyl-p-phenylene units. The PEEK is a semi-crystalline thermoplastic.

In an embodiment, the matrix material of the first polymer matrix composite or the second polymer matrix composite includes LCP or a copolymer of LCP. The LCP, also known as liquid crystalline polymer, is a novel polymer material that generally becomes a liquid crystal under a specified heating state.

In an embodiment, the matrix material of the first polymer matrix composite or the second polymer matrix composite includes a polysulfone (PSF) or a copolymer of PSF.

In some embodiments, a filler material of the first polymer matrix composite or the second polymer matrix composite includes an inorganic substance.

In some embodiments, the filler material of the first polymer matrix composite or the second polymer matrix composite includes one or more inorganic substances of a carbonate (calcium carbonate, magnesium carbonate, barium carbonate, or the like), a sulfate (barium sulfate, calcium sulfate, or the like), a metal oxide (titanium dioxide, zinc oxide, aluminum oxide, magnesium oxide, diantimony trioxide, or the like), a metal powder (a copper powder, an aluminum powder, or the like), a metal hydroxide (aluminum hydroxide, magnesium hydroxide, or the like), a silicon-containing compound (talcum powder, silicon dioxide, montmorillonite, diatomaceous earth, calcium silicate, mica powder, or the like), and carbon (carbon black, carbon nanotubes, graphene, or the like).

The filler material of the first polymer matrix composite or the second polymer matrix composite includes one or more inorganic fiber materials of a glass fiber, a carbon fiber, a basalt fiber, a boron fiber, a silicon carbide fiber, an asbestos fiber, a mineral wool fiber, and a crystal whisker.

In some embodiments, the filler material of the first polymer matrix composite or the second polymer matrix composite includes an organic substance.

In some embodiments, the filler material of the first polymer matrix composite or the second polymer matrix composite includes one or more organic substances of an organic flame retardant (a bromine-containing, phosphorus- and nitrogen-containing, or nitrogen-containing organic compound, or the like), a starch particle, a wood flour, and a husk powder.

In some embodiments, the filler material of the first polymer matrix composite or the second polymer matrix composite includes one or more organic substances of a plant fiber, a cellulose fiber, and a synthetic fiber (an aramid fiber, a polyester fiber, a PA fiber, or the like).

In some embodiments, the filler material of the first polymer matrix composite or the second polymer matrix composite is in one or more of a powder form, a granular form, a fibrous form, and a sheet form.

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the first polymer material of the core structure in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure in the 3D printing wire can be obtained according to the calculation of the diameter of the core structure.

In some embodiments, a printing temperature of the 3D printing wire is in a range of 150° C. to 400° C. The "printing temperature" refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In summary, in the 3D printing wire with the core-shell structure described in the first aspect of the present application, a shell structure formed by the second polymer matrix composite is wrapped around a core structure formed by the first polymer matrix composite. The first polymer matrix composite and the second polymer matrix composite both are a polymer matrix composite, and a filler material volume fraction of the first polymer matrix composite is larger/higher than a filler material volume fraction of the second polymer matrix composite. The 3D printing composite wire prepared accordingly allows a strong bonding strength between different layers during printing, and the 3D printing wire of the present application allows a significantly-stronger interlayer bonding strength than the core layer material used alone, which avoids the decline of an interlayer bonding strength of a composite filling wire and the significant weakening of interlayer bonding at a high filling content in the prior art.

A second aspect of the present application also provides a method for preparing a 3D printing wire, including the following step: a first polymer matrix composite and a second polymer matrix composite are co-extruded to produce a 3D printing wire with a core-shell structure, where in the 3D printing wire with the core-shell structure, a shell structure formed by the second polymer matrix composite is wrapped around a core structure formed by the first polymer matrix composite.

Figure 2:
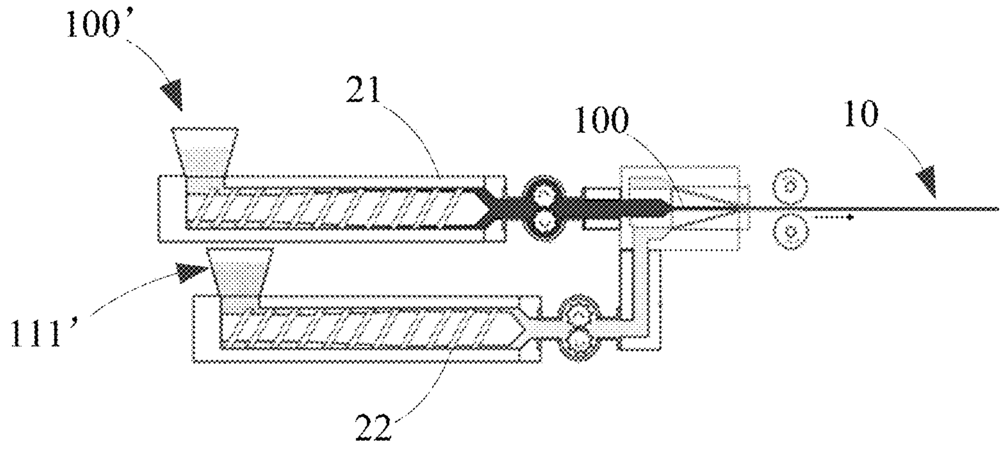
FIG. 2 is a schematic diagram of an apparatus for preparing a 3D printing wire structure in an embodiment of the present application.

In an embodiment, as shown in FIG. 2 illustrating a schematic diagram of an apparatus for preparing a 3D printing wire structure in the embodiment of the present application, the step of co-extruding the first polymer matrix composite and the second polymer matrix composite to produce the 3D printing wire with the core-shell structure includes the following steps: A particle or powder including the first polymer matrix composite 100' is placed in first melt-extrusion device 21, and a particle or powder including the second polymer matrix composite 111' is placed in second melt-extrusion device 22. Through the first melt-extrusion device 21, the first polymer matrix composite 100' is melted, extruded, and drawn to produce core wire 100. Through the second melt-extrusion device 22, the second polymer matrix composite 111' is melted and extruded to wrap the core wire 100, drawing is conducted to produce wire 10, and the wire is cooled to produce the 3D printing wire 10 with the core-shell structure.

In an embodiment, the first melt-extrusion device 21 and the second melt-extrusion device 22 both are a single-screw extruder, and melts of the two materials are extruded through a same die for molding by metrologically controlling extrusion flow rates. According to the embodiment shown in FIG. 2, in the method for preparing a 3D printing wire in the present application, through a multi-layer co-extrusion apparatus/process, two materials with different characteristics are added to two single-screw extruders, respectively, and extrusion flow rates are controlled metrologically, such that the melts of the first polymer material and the second polymer material are extruded through the same die for molding to obtain a double-layer composite wire of the above two materials, namely, the 3D printing wire with the core-shell structure.

In the present application, a composite in the first polymer matrix composite or the second polymer matrix composite refers to a material with a multi-phase composite structure that is prepared from two or more different materials through a specific mixing process.

In the present application, a polymer matrix composite in the first polymer matrix composite or the second polymer matrix composite refers to a composite prepared by introducing a solid additive into a polymer material as a matrix through a specific mixing process, where the solid additive has a different composition and structure from the matrix material and the solid additive is called a filler material. The polymer matrix material can be either a thermosetting polymer material or a thermoplastic polymer material. In some embodiments, there are various diversified types of the filler material, and the filler material includes various organic and inorganic substances, including a fiber material, an inorganic powder, an organic compound, a metal compound, or the like. According to functions of filler materials, the filler materials can be divided into reinforcing fillers, electrically-conductive fillers, thermally-conductive fillers, flame-retardant fillers, low-cost fillers, or the like. A volume fraction of a filler material in a polymer matrix composite is used to evaluate a content of the filler material in the composite, and is called a filler material volume fraction of the polymer matrix composite.

In some embodiments of the present application, a filler material volume fraction of the first polymer matrix composite is higher than a filler material volume fraction of the second polymer matrix composite.

In some other embodiments of the present application, the shell structure 111 includes an unfilled polymer material with a filler material volume fraction of zero.

In an embodiment, the first polymer matrix composite or the second polymer matrix composite is a thermoplastic polymer matrix composite, and specifically, a matrix material of the first polymer matrix composite or the second polymer matrix composite is a thermoplastic polymer. The thermoplastic polymer is, for example, a thermoplastic polymer matrix composite such as polyolefin, PA, polyester, PC, POM, PPE, PPS, PEEK, or LCP.

In some embodiments, matrix materials of the first polymer matrix composite and the second polymer matrix composite may be the same or different.

In some embodiments, a volume fraction of the first polymer matrix composite in the entire 3D printing wire is in a range of 10% to 90% (such as 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90%).

In some embodiments, a $T_g$ value of the first polymer matrix composite or the second polymer matrix composite is in a range of −50° C. to 380° C. (such as −50° C. to 380° C., −40° C. to 380° C., −30° C. to 380° C., −20° C. to 380° C., −10° C. to 380° C., 0° C. to 380° C., 10° C. to 380° C., 20° C. to 380° C., 30° C. to 380° C., 40° C. to 380° C., 50° C. to 380° C., 60° C. to 380° C., 70° C. to 380° C., 80° C. to 380° C., 90° C. to 380° C., 100° C. to 380° C., 110° C. to 380° C., 120° C. to 380° C., 130° C. to 380° C., 140° C. to 380° C., 150° C. to 380° C., 160° C. to 380° C., 170° C. to 380° C., 180° C. to 380° C., 190° C. to 380° C., 200° C. to 380° C., 210° C. to 380° C., 220° C. to 380° C., 230° C. to 380° C., 240° C. to 380° C., 250° C. to 380° C., 260° C. to 380° C., 270° C. to 380° C., 280° C. to 380° C., 290° C. to 380° C., 300° C. to 380° C., 310° C. to 380° C., 320° C. to 380° C., 330° C. to 380° C., 340° C. to 380° C., 350° C. to 380° C., 360° C. to 380° C., or 370° C. to 380° C.).

In some embodiments, the filler material volume fraction of the first polymer matrix composite includes 3 vol % to 60 vol % (such as 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In some embodiments, the filler material volume fraction of the second polymer matrix composite includes 0 vol % to 20 vol % (such as 0 vol %, 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, or 20 vol %).

In some embodiments, a difference between the filler material volume fraction of the first polymer matrix composite and the filler material volume fraction of the second polymer matrix composite is in a range of 1 vol % to 60 vol % (such as 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In the present application, the filler material volume fraction of the first polymer matrix composite is larger (higher) than the filler material volume fraction of the second polymer matrix composite. It should be understood that the expression that the filler material volume fraction is large or small is a relative concept, and it can also be expressed that the filler material volume fraction of the first polymer matrix composite is higher than the filler material volume fraction of the second polymer matrix composite. For example, in some embodiments, a difference between the filler material volume fraction of the first polymer matrix composite and the filler material volume fraction of the second polymer matrix composite is in a range of 1 vol % to 60 vol % (such as 1 vol %, 2 vol %, 3 vol %, 4 vol %, 5 vol %, 6 vol %, 7 vol %, 8 vol %, 9 vol %, 10 vol %, 11 vol %, 12 vol %, 13 vol %, 14 vol %, 15 vol %, 16 vol %, 17 vol %, 18 vol %, 19 vol %, 20 vol %, 21 vol %, 22 vol %, 23 vol %, 24 vol %, 25 vol %, 26 vol %, 27 vol %, 28 vol %, 29 vol %, 30 vol %, 31 vol %, 32 vol %, 33 vol %, 34 vol %, 35 vol %, 36 vol %, 37 vol %, 38 vol %, 39 vol %, 40 vol %, 51 vol %, 52 vol %, 53 vol %, 54 vol %, 55 vol %, 56 vol %, 57 vol %, 58 vol %, 59 vol %, or 60 vol %).

In some embodiments, the first polymer matrix composite or the second polymer matrix composite is a thermoplastic polymer matrix composite.

In an embodiment, the matrix material of the first polymer matrix composite or the second polymer matrix composite includes a polyolefin or a copolymer of a polyolefin. The polyolefin is a polymer compound produced through addition polymerization of olefins. Such an organic polymer is typically produced through polymerization of many simple olefin molecules (α-olefins such as ethylene, propylene, 1-butene, 1-pentene, 1-hexene, 1-octene, and 4-methyl-1-pentene, and some cyclic olefins) that are the same or different. Common polyolefins include PE, poly(1-butene), or the like. The polyolefin is mainly produced through high-pressure polymerization, low-pressure polymerization (including a solution method, a slurry method, a bulk method, and a gas phase method), or the like. Common thermoplastic polyolefins include: PE, PP, PMP, PB-1, or the like; and POEs: PIB, EPR, EPDM, or the like. In some embodiments of the present application, a polyolefin material refers to a material in which a polymer prepared through polymerization or copolymerization of one or more olefins serves as a matrix.

In an embodiment, the matrix material of the first polymer matrix composite or the second polymer matrix composite includes PA or a copolymer of PA. The PA is a polymer synthesized by polymerization of a monomer including carboxyl and amino through amide bonds. In some embodiments, the PA is commonly known as nylon. Nylon usually refers to a condensation polymer in which constituent units may be linked through amides. For example, in the present application, the nylon may be one or more selected from the group consisting of the following: nylon 6, a nylon 6 elastomer, nylon 66, a binary nylon 66/6 copolymer, nylon 11, a nylon 11 elastomer, nylon 12, a nylon 12 elastomer, nylon 1010, nylon 1012, and nylon 610. The nylon 6 elastomer is a block copolymer with nylon 6 as a hard segment and a polyether or polyester as a soft segment. The nylon 11 elastomer is a block copolymer with nylon 11 as a hard segment and a polyether or polyester as a soft segment. The nylon 12 elastomer is a block copolymer with nylon 12 as a hard segment and a polyether or polyester as a soft segment. For example, the nylon 6 has the following chemical structure:

Nylon 6

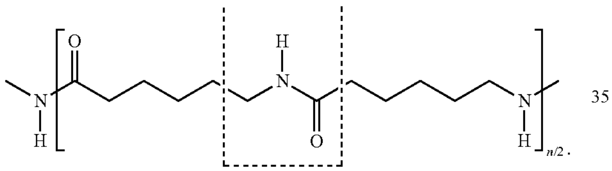

The nylon 66 has the following chemical structure:

Nylon 6-6

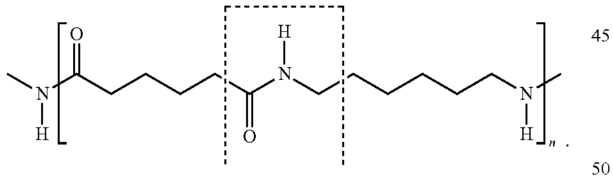

The nylon 12 (polydodecalactam) has the following chemical structure:—$[NH—(CH_2)_{11}—CO]_n]$—.

In an embodiment, the matrix material of the first polymer matrix composite or the second polymer matrix composite includes a polyester or a copolymer of a polyester. The polyester is a general term for polymers produced through polycondensation of polyols and polyacids. The polyester mainly refers to PET, and customarily also includes linear thermoplastic resins such as PBT and polyarylester.

In an embodiment, the matrix material of the first polymer matrix composite or the second polymer matrix composite is PC or a copolymer of PC. The PC, also known as PC plastic, is a polymer with a carbonate group in a molecular chain. According to structures of ester groups, the PC can include aliphatic PC, aromatic PC, aliphatic-aromatic PC, or the like.

In an embodiment, the matrix material of the first polymer matrix composite or the second polymer matrix composite includes POM or a copolymer of POM. The POM, also known as acetal resin, polyformaldehyde, or polyacetal, is a thermoplastic crystalline polymer.

In an embodiment, the matrix material of the first polymer matrix composite or the second polymer matrix composite includes PPE or a copolymer of PPE. The PPE is a high-temperature thermoplastic, and is also known as PPO. The PPO is an amorphous thermoplastic polymer.

In an embodiment, the matrix material of the first polymer matrix composite or the second polymer matrix composite includes PPS or a copolymer of PPS. The PPS is a polymer molecule including p-phenylene sulfide repeating structural units.

In an embodiment, the matrix material of the first polymer matrix composite or the second polymer matrix composite includes PEEK or a copolymer of PEEK. The PEEK is a linear aromatic polymer compound consisting of oxy-p-phenylene-carbonyl-p-phenylene units. The PEEK is a semi-crystalline thermoplastic.

In an embodiment, the matrix material of the first polymer matrix composite or the second polymer matrix composite includes LCP or a copolymer of LCP. The LCP, also known as liquid crystalline polymer, is a novel polymer material that generally becomes a liquid crystal under a specified heating state.

In an embodiment, the matrix material of the first polymer matrix composite or the second polymer matrix composite includes PSF or a copolymer of PSF.

In some embodiments, a filler material of the first polymer matrix composite or the second polymer matrix composite includes an inorganic substance.

In some embodiments, the filler material of the first polymer matrix composite or the second polymer matrix composite includes one or more inorganic substances of a carbonate (calcium carbonate, magnesium carbonate, barium carbonate, or the like), a sulfate (barium sulfate, calcium sulfate, or the like), a metal oxide (titanium dioxide, zinc oxide, aluminum oxide, magnesium oxide, diantimony trioxide, or the like), a metal powder (a copper powder, an aluminum powder, or the like), a metal hydroxide (aluminum hydroxide, magnesium hydroxide, or the like), a silicon-containing compound (talcum powder, silicon dioxide, montmorillonite, diatomaceous earth, calcium silicate, mica powder, or the like), and carbon (carbon black, carbon nanotubes, graphene, or the like).

The filler material of the first polymer matrix composite or the second polymer matrix composite includes one or more inorganic fiber materials of a glass fiber, a carbon fiber, a basalt fiber, a boron fiber, a silicon carbide fiber, an asbestos fiber, a mineral wool fiber, and a crystal whisker.

In some embodiments, the filler material of the first polymer matrix composite or the second polymer matrix composite includes an organic substance.

In some embodiments, the filler material of the first polymer matrix composite or the second polymer matrix composite includes one or more organic substances of an organic flame retardant (a bromine-containing, phosphorus- and nitrogen-containing, or nitrogen-containing organic compound, or the like), a starch particle, a wood flour, and a husk powder.

In some embodiments, the filler material of the first polymer matrix composite or the second polymer matrix composite includes one or more organic substances of a plant fiber, a cellulose fiber, and a synthetic fiber (an aramid fiber, a polyester fiber, a PA fiber, or the like).

In some embodiments, the filler material of the first polymer matrix composite or the second polymer matrix composite is in one or more of a powder form, a granular form, a fibrous form, and a sheet form.

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the first polymer material of the core structure in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure in the 3D printing wire can be obtained according to the calculation of the diameter of the core structure.

In some embodiments, a printing temperature of the 3D printing wire is in a range of 150° C. to 400° C. The "printing temperature" refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In summary, in the method for preparing a 3D printing wire described in the second aspect of the present application, the 3D printing wire with the core-shell structure is produced by co-extruding a first polymer matrix composite and a second polymer matrix composite, where in the 3D printing wire with the core-shell structure, a shell structure formed by the second polymer matrix composite is wrapped around a core structure formed by the first polymer matrix composite. The first polymer matrix composite and the second polymer matrix composite both are a polymer matrix composite, and a filler material volume fraction of the first polymer matrix composite is larger than a filler material volume fraction of the second polymer matrix composite. The 3D printing composite wire prepared accordingly allows a strong bonding strength between different layers during printing, and the 3D printing wire of the present application allows a significantly-stronger interlayer bonding strength than the core layer material used alone, which avoids the decline of an interlayer bonding strength of a composite filling wire and the significant weakening of interlayer bonding at a high filling content in the prior art.

Examples and comparative examples of the 3D printing wires described in the first aspect and the second aspect:

Example 1

In this example, a 3D printing wire with a core-shell structure produced by co-extruding a first polymer matrix composite and a second polymer matrix composite was provided. The first polymer composite for a core structure was a starch particle-filled PLA composite with a starch particle filling content of 40 vol %. A volume fraction of the core-composite in the entire wire was 70 vol %. The second polymer composite for a shell structure was a starch particle-filled PLA composite with a starch particle filling content of 10 vol %. A volume fraction of the shell-composite in the entire wire was 30 vol %.

In this example, a method for preparing the 3D printing wire with the core-shell structure was as follows: The first polymer composite of PLA filled with 40 vol % of starch particles was placed in a first melt-extrusion device, and a second polymer composite of PLA filled with 10 vol % of starch particles was placed in a second melt-extrusion device. Through the first melt-extrusion device, the first polymer material was melted, extruded, and drawn to produce a core wire. Through the second melt-extrusion device, the second polymer composite was melted and extruded to wrap the core wire, drawing was conducted to produce a wire, and the wire was cooled to produce the 3D printing wire with the core-shell structure.

Figure 6:
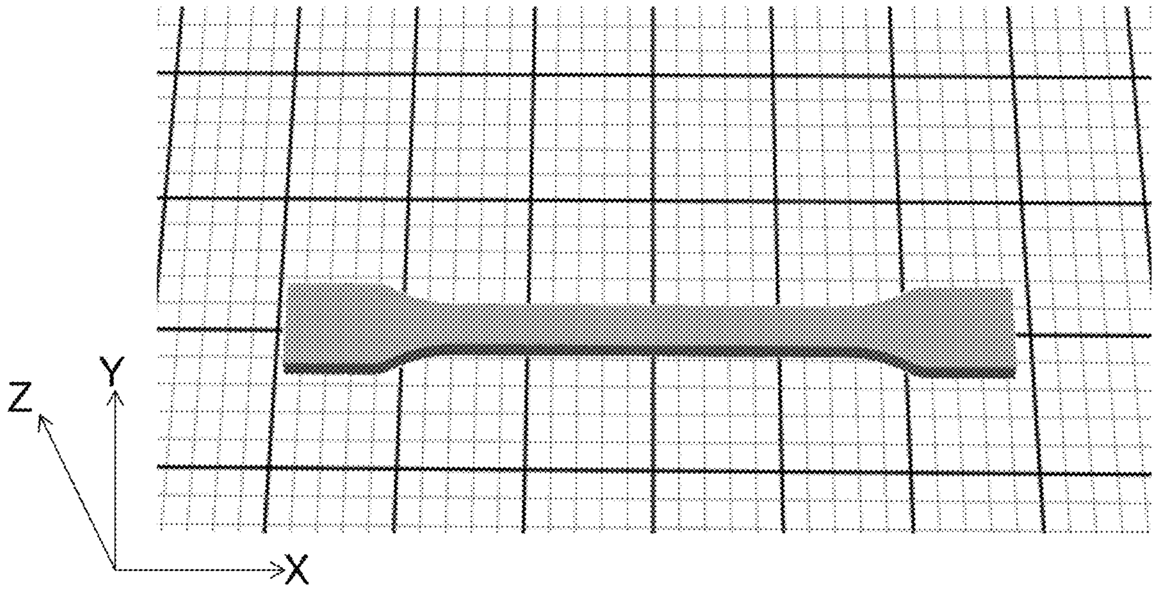
FIG. 6 is a schematic diagram of X-Y axis stretching of a sample strip on a member platform of a printing apparatus in a test example.
Figure 7:
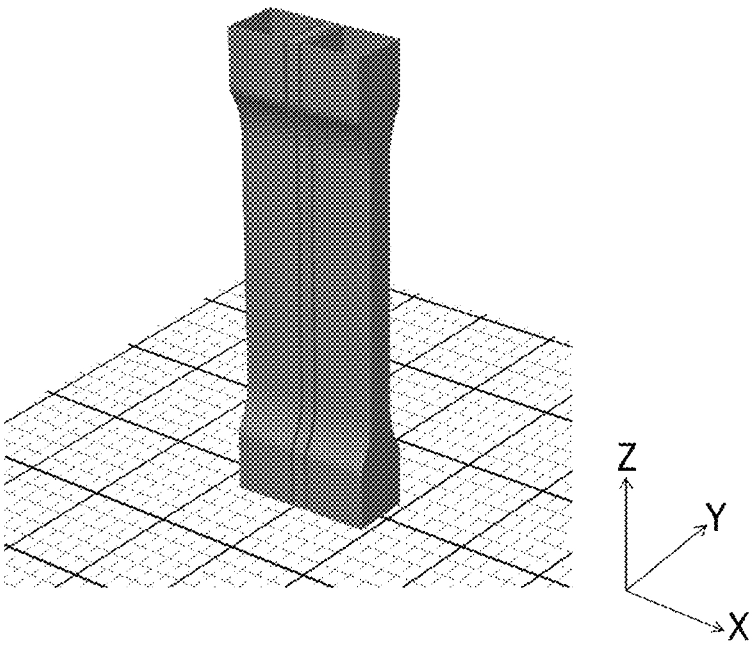
FIG. 7 is a schematic diagram of Z-axis stretching of a sample strip on a member platform of a printing apparatus in a test example.
Figure 8:
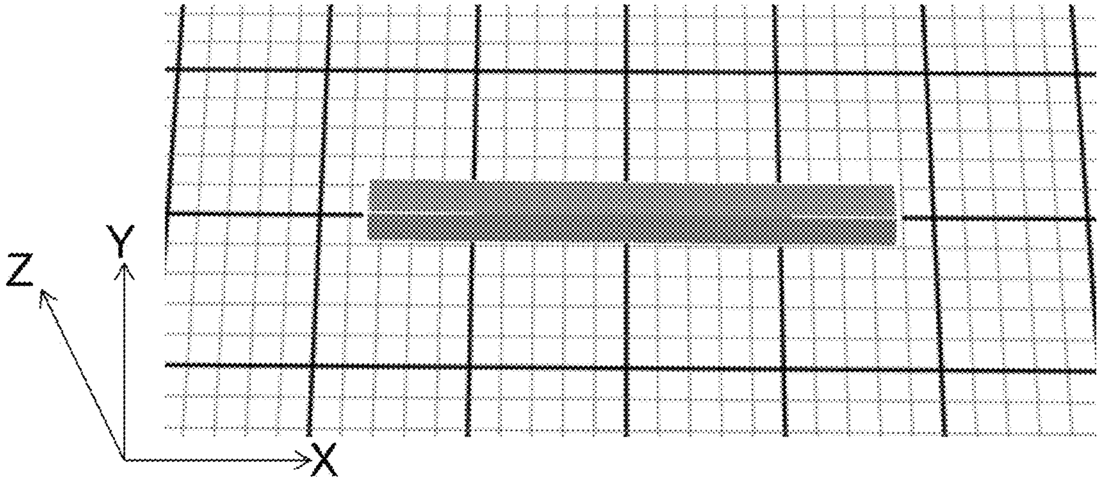
FIG. 8 is a schematic diagram of printing of bending and impact sample strips on a member platform of a printing apparatus in a test example.

In this example, the prepared 3D printing wire with the core-shell structure was subjected to a printing test, and standard mechanical property test sample strips were printed under the following printing conditions: a printing temperature: 210° C.; a printing speed: 50 mm/s; a printing filling degree: 100%; and a printing fan cooling ratio: 100%. As shown in FIG. 6 to FIG. 8, FIG. 6 is a schematic diagram of X-Y axis stretching of a sample strip on a member platform of a printing apparatus in a test example, FIG. 7 is a schematic diagram of Z axis stretching of a sample strip on a member platform of a printing apparatus in a test example, and FIG. 8 is a schematic diagram of printing of bending and impact sample strips on a member platform of a printing apparatus in a test example.

In the test example, the 3D printing wire with the core-shell structure was subjected to a mechanical property test. Table 1 shows the mechanical properties of printing of the composite wire with the PLA/starch particle core-shell structure.

TABLE 1

| Mechanical properties | Test results | Test standards |
|---|---|---|
| Z tensile strength | 25.3 ± 0.8 MPa | GB/T 1040 |
| X-Y tensile strength | 53.2 ± 0.6 MPa | GB/T 1040 |

TABLE 1-continued

| Mechanical properties | Test results | Test standards |
|---|---|---|
| X-Y bending strength | 65.7 ± 1.2 MPa | GB/T 9341 |
| Notched izod impact strength | 4.3 ± 0.6 $KJ/m^2$ | GB/T 1043 |

Comparative Example 1

In this comparative example, a PLA/starch particle blended composite wire was adopted, and the same PLA, the same starch particle material, and the same starch particle filling volume fraction of 31 vol % as in the above example were adopted. The traditional process route for blending modification was adopted to prepare a blended composite. That is, PLA filled with starch particles in a volume fraction of 31 vol % and PLA filled with starch particles in a volume fraction of 69 vol % were subjected to twin-screw blending modification and granulation and then to single-screw extrusion to prepare a 3D printing wire with a processing temperature of 150° C. to 220° C.

Wire printing test: Test sample strips were printed under the same printing conditions as in the example.

Mechanical property test: The mechanical property test was conducted under the same mechanical property test standards and the same test conditions as in the example, and corresponding test results were compared. Table 2 shows the mechanical properties of printing of the PLA/starch particle blended composite wire.

TABLE 2

| Mechanical properties | Test results | Test standards |
|---|---|---|
| Z tensile strength | 8.2 ± 1.3 MPa | GB/T 1040 |
| X-Y tensile strength | 49.3 ± 0.5 MPa | GB/T 1040 |
| X-Y bending strength | 58.6 ± 1.0 MPa | GB/T 9341 |
| Notched izod impact strength | 3.7 ± 0.6 $KJ/m^2$ | GB/T 1043 |

In order to further illustrate the technical solutions of the present application, the present application provides specific implementations illustrated by Examples 4 to 14 and Comparative Examples 4 to 9.

Example 4

Example 4 was different from Example 1 in that:

In a 3D printing wire with a core-shell structure produced by co-extruding a first polymer matrix composite and a second polymer matrix composite, a material for a core structure was the first polymer matrix composite, and the first polymer matrix composite was a starch particle-filled PLA composite with a starch particle filling content of 15 vol %.

Example 5

Example 5 was different from Example 1 in that:

In a 3D printing wire with a core-shell structure produced by co-extruding a first polymer matrix composite and a second polymer matrix composite, a material for a core structure was the first polymer matrix composite, and the first polymer matrix composite was a starch particle-filled PLA composite with a starch particle filling content of 30 vol %.

Example 6

Example 6 was different from Example 1 in that:

In a 3D printing wire with a core-shell structure produced by co-extruding a first polymer matrix composite and a second polymer matrix composite, a material for a core structure was the first polymer matrix composite, and the first polymer matrix composite was a starch particle-filled PLA composite with a starch particle filling content of 50 vol %.

Example 7

Example 7 was different from Example 1 in that:

In a 3D printing wire with a core-shell structure produced by co-extruding a first polymer matrix composite and a second polymer matrix composite, a material for a core structure was the first polymer matrix composite, and the first polymer matrix composite was a starch particle-filled PLA composite with a starch particle filling content of 60 vol %.

Example 8

Example 8 was different from Example 7 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 60 vol %. A material for a shell structure was the second polymer matrix composite, and the second polymer matrix composite was a starch particle-filled PLA composite with a starch particle filling content of 3 vol %.

Example 9

Example 9 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A material for a shell structure was the second polymer matrix composite, and the second polymer matrix composite was a starch particle-filled PLA composite with a starch particle filling content of 20 vol %.

Example 10

Example 10 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A material for a shell structure was the second polymer matrix composite, and the second polymer matrix composite was a starch particle-filled PLA composite with a starch particle filling content of 30 vol %.

Example 11

Example 11 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A volume fraction of the core-composite in the entire wire was 50 vol %. A material for a shell structure was the second polymer matrix composite, and the second polymer matrix composite was a starch particle-filled PLA composite with a starch particle filling content of 10 vol %. A volume fraction of the shell-composite in the entire wire was 50 vol %.

Example 12

Example 12 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A volume fraction of the core-composite in the entire wire was 80 vol %. A material for a shell structure was the second polymer matrix composite, and the second polymer matrix composite was a starch particle-filled PLA composite with a starch particle filling content of 10 vol %. A volume fraction of the shell-composite in the entire wire was 20 vol %.

Example 13

Example 13 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A volume fraction of the core-composite in the entire wire was 90 vol %. A material for a shell structure was the second polymer matrix composite, and the second polymer matrix composite was a starch particle-filled PLA composite with a starch particle filling content of 10 vol %. A volume fraction of the shell-composite in the entire wire was 10 vol %.

Example 14

Example 14 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a talcum powder-filled nylon 6 composite with a talcum powder filling content of 40 vol %. A volume fraction of the core-composite in the entire wire was 70 vol %. A material for a shell structure was the second polymer matrix composite, and the second polymer matrix composite was a talcum powder-filled thermoplastic polyurethane (TPU) composite with a talcum powder filling content of 10 vol %. A volume fraction of the shell-composite in the entire wire was 30 vol %.

In Examples 4 to 14, a method for preparing the 3D printing wire with the core-shell structure was as follows: The first polymer matrix composite of PLA filled with 40 vol % of starch particles was placed in a first melt-extrusion device, and a second polymer matrix composite of PLA filled with 10 vol % of starch particles was placed in a second melt-extrusion device. Through the first melt-extrusion device, the first polymer material was melted, extruded, and drawn to produce a core wire. Through the second melt-extrusion device, the second polymer matrix composite was melted and extruded to wrap the core wire, drawing was conducted to produce a wire, and the wire was cooled to produce the 3D printing wire with the core-shell structure.

The prepared 3D printing wire with the core-shell structure was subjected to a printing test, and standard mechanical property test sample strips were printed under the following printing conditions: a printing temperature: 210° C.; a printing speed: 50 mm/s; a printing filling degree: 100%; and a printing fan cooling ratio: 100%. As shown in FIG. 6 to FIG. 8, FIG. 6 is a schematic diagram of X-Y axis stretching of a sample strip on a member platform of a printing apparatus in a test example, FIG. 7 is a schematic diagram of Z axis stretching of a sample strip on a member platform of a printing apparatus in a test example, and FIG. 8 is a schematic diagram of printing of bending and impact sample strips on a member platform of a printing apparatus in a test example.

In the test example, the 3D printing wires with the core-shell structures each were subjected to a mechanical property test. Table 1-2 and Table 1-3 show the mechanical properties of printing of the composite wires with the core-shell structures.

TABLE 1-2

| | Example 4 | Example 5 | Example 6 | Example 7 | Example 8 | Example 9 |
|---|---|---|---|---|---|---|
| Z tensile strength | 30.4 ± 0.6 MPa | 27.2 ± 0.5 MPa | 24.5 ± 0.3 MPa | 24.7 ± 0.9 MPa | 33.9 ± 0.4 MPa | 17.8 ± 0.7 MPa |
| X-Y tensile strength | 42.5 ± 0.5 MPa | 50.3 ± 0.6 MPa | 55.8 ± 0.4 MPa | 59.1 ± 0.3 MPa | 52.3 ± 0.4 MPa | 57.2 ± 0.8 MPa |
| X-Y bending strength | 55.2 ± 1.1 MPa | 61.7 ± 1.0 Mpa | 67.9 ± 0.8 MPa | 72.6 ± 1.2 MPa | 66.6 ± 0.4 MPa | 68.1 ± 0.9 MPa |
| Notched izod impact strength | 3.8 ± 0.2 $KJ/m^2$ | 4.1 ± 0.5 $KJ/m^2$ | 4.8 ± 0.6 $KJ/m^2$ | 5.2 ± 0.3 $KJ/m^2$ | 4.3 ± 0.9 $KJ/m^2$ | 3.9 ± 0.5 $KJ/m^2$ |

TABLE 1-3

| | Example 10 | Example 11 | Example 12 | Example 13 | Example 14 |
|---|---|---|---|---|---|
| Z tensile strength | 9.3 ± 0.5 MPa | 27.4 ± 0.6 MPa | 25.8 ± 0.7 MPa | 24.3 ± 1.0 MPa | 46.3 ± 1.5 MPa |
| X-Y tensile strength | 59.8 ± 0.4 MPa | 48.3 ± 0.5 MPa | 51.3 ± 0.5 MPa | 58.6 ± 0.9 MPa | 93.9 ± 1.4 MPa |
| X-Y bending strength | 72.4 ± 1.2 MPa | 69.2 ± 0.9 MPa | 63.6 ± 1.1 MPa | 68.1 ± 0.7 MPa | 105.7 ± 0.8 MPa |
| Notched izod impact strength | 3.7 ± 0.4 KJ/$m^2$ | 4.6 ± 0.3 KJ/$m^2$ | 4.4 ± 0.3 KJ/$m^2$ | 3.9 ± 0.5 KJ/$m^2$ | 9.6 ± 0.7 KJ/$m^2$ |

Comparative Examples 4 to 9

Comparative Example 4 was different from Example 1 in that:

In this example, a 3D printing wire with a core-shell structure produced by co-extruding a first polymer matrix composite and a second polymer matrix composite was provided. A material for a core structure was the first polymer matrix composite, and the first polymer matrix composite was a starch particle-filled PLA composite with a starch particle filling content of 40 vol %. A volume fraction of the core-composite in the entire wire was 70 vol %. A material for a shell structure was the second polymer material, and the second polymer material was a PLA composite with a filler material filling content of 0 vol %. A volume fraction of the shell-composite in the entire wire was 30 vol %.

Comparative Example 5

Comparative Example 5 was different from Comparative Example 1 in that:

In this comparative example, a PLA/starch particle blended composite wire was adopted, and the same PLA, the same starch particle material, and the same starch particle filling volume fraction as in Example 4 were adopted, that is, PLA filled with starch particles in a volume fraction of 13.5 vol % and PLA filled with starch particles in a volume fraction of 86.5 vol % were adopted.

Comparative Example 6

Comparative Example 6 was different from Comparative Example 1 in that:

In this comparative example, a PLA/starch particle blended composite wire was adopted, and the same PLA, the same starch particle material, and the same starch particle filling volume fraction as in Example 5 were adopted, that is, PLA filled with starch particles in a volume fraction of 24 vol % and PLA filled with starch particles in a volume fraction of 76 vol % were adopted.

Comparative Example 7

Comparative Example 7 was different from Comparative Example 1 in that:

In this comparative example, a PLA/starch particle blended composite wire was adopted, and the same PLA, the same starch particle material, and the same starch particle filling volume fraction as in Example 6 were adopted, that is, PLA filled with starch particles in a volume fraction of 38 vol % and PLA filled with starch particles in a volume fraction of 62 vol % were adopted.

Comparative Example 8

Comparative Example 8 was different from Comparative Example 1 in that:

In this comparative example, a PLA/starch particle blended composite wire was adopted, and the same PLA, the same starch particle material, and the same starch particle filling volume fraction as in Example 7 were adopted, that is, PLA filled with starch particles in a volume fraction of 45 vol % and PLA filled with starch particles in a volume fraction of 55 vol % were adopted.

Comparative Example 9

Comparative Example 9 was different from Comparative Example 1 in that:

In this comparative example, a nylon 6/talcum powder blended composite wire was adopted, and the same nylon 6, the same talcum powder material, and the same talcum powder filling volume fraction as in Example 14 were adopted, that is, nylon 6 filled with the talcum powder in a volume fraction of 24 vol % and nylon 6 filled with the talcum powder in a volume fraction of 76 vol % were adopted.

In Comparative Example 4, a method for preparing the 3D printing wire with the core-shell structure was as follows: The first polymer matrix composite of PLA filled with 40 vol % of starch particles was placed in a first melt-extrusion device, and a second polymer matrix composite of PLA filled with 10 vol % of starch particles was placed in a second melt-extrusion device. Through the first melt-extrusion device, the first polymer material was melted, extruded, and drawn to produce a core wire. Through the second melt-extrusion device, the second polymer matrix composite was melted and extruded to wrap the core wire, drawing was conducted to produce a wire, and the wire was cooled to produce the 3D printing wire with the core-shell structure.

The composite wires in Comparative Examples 5 to 9 did not have a core-shell structure, and each were prepared through twin-screw blending modification and granulation and single-screw extrusion with a processing temperature of 150° C. to 220° C.

Wire printing test: Test sample strips were printed under the same printing conditions as in the example.

Mechanical property test: The mechanical property test was conducted under the same mechanical property test standards and the same test conditions as in the example, and corresponding test results were compared. Table 2-2 shows the mechanical properties of printing of the blended composite wires.

TABLE 2-2

| | Comparative Example 4 | Comparative Example 5 | Comparative Example 6 | Comparative Example 7 | Comparative Example 8 | Comparative Example 9 |
|---|---|---|---|---|---|---|
| Z tensile strength | 35.8 ± 0.6 MPa | 7.9 ± 0.2 MPa | 7.2 ± 0.5 MPa | 6.5 ± 0.4 MPa | 5.3 ± 0.3 MPa | 22.8 ± 1.8 MPa |
| X-Y tensile strength | 43.2 ± 0.4 MPa | 37.1 ± 0.3 MPa | 46.5 ± 0.5 MPa | 48.8 ± 0.6 MPa | 55.1 ± 0.9 MPa | 84.2 ± 1.6 MPa |
| X-Y bending strength | 56.7 ± 2.3 MPa | 51.8 ± 1.3 MPa | 55.7 ± 1.5 MPa | 63.8 ± 0.7 MPa | 69.3 ± 0.8 MPa | 90.3 ± 2.5 MPa |
| Notched izod impact strength | 3.5 ± 0.9 $KJ/m^2$ | 3.6 ± 0.7 $KJ/m^2$ | 4.0 ± 0.8 $KJ/m^2$ | 4.4 ± 0.3 $KJ/m^2$ | 4.9 ± 0.4 $KJ/m^2$ | 7.2 ± 0.6 $KJ/m^2$ |

Comparing Table 1 with Table 2: Mechanical properties of printing of a wire with a core-shell structure and a blended composite wire that have the same chemical component contents of the PLA/starch particle composite are compared, and it can be known that a printed object of the wire with a core-shell structure has better mechanical properties than a printed object of the blended composite wire as a whole. The wire with a core-shell structure is slightly better than the blended composite wire in terms of mechanical properties such as a tensile strength, a bending strength, and a notched izod impact strength of printing, and is significantly better than the blended composite wire in terms of an interlayer bonding strength (Z tensile strength).

According to the data in Table 1-2 and Table 1-3: The 3D printing wire with the core-shell structure in the present application has excellent mechanical properties. Specifically, according to the data of Examples 4 to 10: When a volume fraction of a filler material in a first polymer matrix composite as a core material is 3 vol % to 60 vol % and a volume fraction of a filler material in a second polymer matrix composite as a shell material is 1 vol % to 20 vol %, the 3D printing wire with the core-shell structure has excellent mechanical properties. When a volume fraction of the first polymer matrix composite in the entire 3D printing wire is in a range of 10% to 90%, the 3D printing wire has excellent mechanical properties. Further, according to the data of Examples 11 to 13: When the volume fraction of the first polymer matrix composite as the core material in the 3D printing wire is 50 vol % to 90 vol %, the 3D printing wire has an excellent tensile strength, bending strength, and notched izod impact strength, and exhibits very prominent comprehensive mechanical properties. According to the data of Example 14: A 3D printing wire with excellent mechanical properties can also be obtained using a different polymer material and filler material from Example 1 of the present application.

According to the data of Comparative Example 4 in Table 2-2 and Examples 1, 9, and 10: For the wire with a core-shell structure, a Z-axis tensile strength tends to decrease with the increase of a content of a filler material in a shell material. Comparative Example 4 has an adequate Z-axis tensile strength. However, because there is poor compatibility between core and shell materials due to the absence of a filler material in the shell material, the X-Y tensile strength, bending strength, and notched izod impact strength all decrease to some extent and the overall mechanical properties are insufficient.

According to the data of Comparative Examples 5 to 9 in Table 2-2 and Examples 4 to 7 and 14: For the blended wire without a core-shell structure, the Z-axis tensile strength of the wire decreases with the increase of a filling content of a filler material. It can be seen from the comparison between the blended wire without a core-shell structure and the wire with a core-shell structure, the overall mechanical properties decrease, and especially the Z-axis interlayer strength rapidly decreases.

In summary, in the 3D printing wire described in the first aspect and the method for preparing a 3D printing wire described in the second aspect of the present application, the 3D printing wire with the core-shell structure is produced by co-extruding a first polymer matrix composite and a second polymer matrix composite, where in the 3D printing wire with the core-shell structure, a shell structure formed by the second polymer matrix composite is wrapped around a core structure formed by the first polymer matrix composite. The first polymer matrix composite and the second polymer matrix composite both are a polymer matrix composite, and a filler material volume fraction of the first polymer matrix composite is larger than a filler material volume fraction of the second polymer matrix composite. The 3D printing composite wire prepared accordingly allows a strong bonding strength between different layers during printing, and the 3D printing wire of the present application allows a significantly-stronger interlayer bonding strength than the core layer material used alone, which avoids the decline of an interlayer bonding strength of a composite filling wire and the significant weakening of interlayer bonding at a high filling content in the prior art.

[004 Case]

The application of the existing melt blending-based modification technology in the technical field of extrusion 3D printing is still faced with some common problems, such as weakening of bonding between printed layers caused by a dispersed multi-phase structure in a wire when the existing melt blending-based modification technology is used for extrusion 3D printing. There are often contradictions between the printability and end-use of a material, which cannot be deeply optimized by the general modification technology. Therefore, how to continuously compound a plurality of materials into a wire structure to form a continuous phase morphological structure and overcome the above-mentioned technical pain points has become a technical problem to be solved urgently by those skilled in the art. Accordingly, the present application provides a 3D printing wire in a third aspect and a method for preparing a 3D printing wire in a fourth aspect, so as to solve the technical pain points such as material compounding and molding and post-treating faced when a single material is adopted for printing under the existing technical framework.

The third aspect of the present application provides a 3D printing wire. The 3D printing wire can be used in a 3D printing apparatus based on FDM, namely, an FDM apparatus, such that the 3D printing wire of the present application is laid layer by layer along a preset printing path to allow 3D printing to obtain a 3D object. FIG. 1 is a schematic structural diagram of the 3D printing wire of the present application. As shown in this figure, the 3D printing wire 10 includes core structure 100 including a first polymer material and shell structure 111 that includes a second polymer material and is wrapped around the core structure 100, where a $T_g$ value of the first polymer material is different from a $T_g$ value of the second polymer material.

In an embodiment, the $T_g$ refers to a temperature at which a glassy substance is reversible between a glassy state and a highly-elastic state. It should be understood that $T_g$ of a polymer material is one of characteristic temperatures of the polymer material, and corresponds to a temperature at which molecular chain segments begin to move during a heating process for the polymer material. There are many methods to measure $T_g$ by measuring physical property changes during a glass transition process of a polymer material, which usually include the following 4 types: a volume change (a dilatometer method), thermodynamic property (differential thermal analysis (DTA) and differential scanning calorimetry (DSC)) and mechanical property (a thermomechanical method, a stress relaxation method, and a dynamic mechanical relaxation method (dynamic mechanical analysis (DMA))) changes, and an electromagnetic effect (a dielectric relaxation method). $T_g$ values measured by different measurement methods are different and are not generally comparable. Therefore, the description of $T_g$ values in the present application refers to the comparison of $T_g$ values measured by the same measurement method under the same measurement conditions.

In an embodiment of the present application, the $T_g$ value of the first polymer material is higher than the $T_g$ value of the second polymer material.

In the above embodiment, the core structure including the first polymer material is a material with high $T_g$, and the shell structure including the second polymer material is a material with low $T_g$. It should be understood that the high $T_g$ and the low $T_g$ are relative concepts, and there is a different between the two.

In another embodiment of the present application, the $T_g$ value of the first polymer material is lower than the $T_g$ value of the second polymer material. In an embodiment, the core structure including the first polymer material is a material with low $T_g$, and the shell structure including the second polymer material is a material with high $T_g$.

In some embodiments, a $T_g$ value of the core structure including the first polymer material or the shell structure including the second polymer material is in a range of −50° C. to 380° C.

Preferably, the $T_g$ value of the core structure including the first polymer material or the shell structure including the second polymer material is in a range of 0° C. to 300° C.

In some embodiments, a $T_g$ value of the core structure including the first polymer material is in a range of 40° C. to 200° C. (such as 40° C. to 200° C., 50° C. to 200° C., 60° C. to 200° C., 70° C. to 200° C., 80° C. to 200° C., 90° C. to 200° C., 100° C. to 200° C., 110° C. to 200° C., 120° C. to 200° C., 130° C. to 200° C., 140° C. to 200° C., 150° C. to 200° C., 160° C. to 200° C., 170° C. to 200° C., 180° C. to 200° C., or 190° C. to 200° C.).

In some embodiments, a $T_g$ value of the shell structure including the second polymer material is in a range of 40° C. to 200° C. (such as 40° C. to 200° C., 50° C. to 200° C., 60° C. to 200° C., 70° C. to 200° C., 80° C. to 200° C., 90° C. to 200° C., 100° C. to 200° C., 110° C. to 200° C., 120° C. to 200° C., 130° C. to 200° C., 140° C. to 200° C., 150° C. to 200° C., 160° C. to 200° C., 170° C. to 200° C., 180° C. to 200° C., or 190° C. to 200° C.).

As described in the above embodiment, the $T_g$ value of the core structure including the first polymer material is higher than the $T_g$ value of the shell structure including the second polymer material. In an embodiment, a difference between the $T_g$ value of the core structure including the first polymer material and the $T_g$ value of the shell structure including the second polymer material is in a range of 1° C. to 350° C. (such as 1° C. to 350° C., 20° C. to 350° C., 40° C. to 350° C., 60° C. to 350° C., 80° C. to 350° C., 100° C. to 350° C., 120° C. to 350° C., 140° C. to 350° C., 160° C. to 350° C., 180° C. to 350° C., 200° C. to 350° C., 220° C. to 350° C., 240° C. to 350° C., 260° C. to 350° C., 280° C. to 350° C., 300° C. to 350° C., 320° C. to 350° C., or 340° C. to 350° C.).

Preferably, the difference between the $T_g$ value of the core structure including the first polymer material and the $T_g$ value of the shell structure including the second polymer material is in a range of 1° C. to 300° C. (such as 1° C. to 300° C., 10° C. to 300° C., 20° C. to 300° C., 30° C. to 300° C., 40° C. to 300° C., 50° C. to 300° C., 60° C. to 300° C., 70° C. to 300° C., 80° C. to 300° C., 90° C. to 300° C., 100° C. to 300° C., 110° C. to 300° C., 120° C. to 300° C., 130° C. to 300° C., 140° C. to 300° C., 150° C. to 300° C., 160° C. to 300° C., 170° C. to 300° C., 180° C. to 300° C., 190° C. to 300° C., 200° C. to 300° C., 210° C. to 300° C., 220° C. to 300° C., 230° C. to 300° C., 240° C. to 300° C., 250° C. to 300° C., 260° C. to 300° C., 270° C. to 300° C., 280° C. to 300° C., or 290° C. to 300° C.).

More specifically, the difference between the $T_g$ value of the core structure including the first polymer material and the $T_g$ value of the shell structure including the second polymer material is in a range of 1° C. to 200° C. (such as 1° C. to 200° C., 5° C. to 200° C., 10° C. to 200° C., 15° C. to 200° C., 20° C. to 200° C., 25° C. to 200° C., 30° C. to 200° C., 35° C. to 200° C., 40° C. to 200° C., 45° C. to 200° C., 50° C. to 200° C., 55° C. to 200° C., 60° C. to 200° C., 65° C. to 200° C., 70° C. to 200° C., 75° C. to 200° C., 80° C. to 200° C., 85° C. to 200° C., 90° C. to 200° C., 95° C. to 200° C., 100° C. to 200° C., 105° C. to 200° C., 110° C. to 200° C., 115° C. to 200° C., 120° C. to 200° C., 125° C. to 200° C., 130° C. to 200° C., 135° C. to 200° C., 140° C. to 200° C., 145° C. to 200° C., 150° C. to 200° C., 155° C. to 200° C., 160° C. to 200° C., 165° C. to 200° C., 170° C. to 200° C., 175° C. to 200° C., 180° C. to 200° C., 185° C. to 200° C., 190° C. to 200° C., or 195° C. to 200° C.).

The 3D printing wire includes a core structure including a first polymer material and a shell structure that is wrapped around the core structure and includes a second polymer material, where the core structure and the shell structure can be in different mixing volume ratios.

In some other embodiments, a volume fraction of the core structure including the first polymer material in the entire 3D printing wire is in a range of 10% to 90% (such as 10% to 90%, 15% to 90%, 20% to 90%, 25% to 90%, 30% to 90%, 35% to 90%, 40% to 90%, 45% to 90%, 50% to 90%, 55% to 90%, 60% to 90%, 65% to 90%, 70% to 90%, 75% to 90%, 80% to 90%, or 85% to 90%).

In some embodiments, the core structure including the first polymer material includes a PC material, a copolymer of a PC material, or a composite with a PC material as a matrix material. The PC, also known as PC plastic, is a polymer with a carbonate group in a molecular chain. According to structures of ester groups, the PC can include aliphatic PC, aromatic PC, aliphatic-aromatic PC, or the like.

In some embodiments, the core structure including the first polymer material is a PSF material, a copolymer of a PSF material, or a composite with a PSF material as a matrix material. The PSF refers to a thermoplastic polymer material with hydrocarbyl-$SO_2$-hydrocarbyl structural units in a structure.

In some embodiments, the core structure including the first polymer material is PEEK, a copolymer of PEEK, or a composite with PEEK as a matrix material. The PEEK is a linear aromatic polymer compound consisting of oxy-p-phenylene-carbonyl-p-phenylene units. The PEEK is a semi-crystalline thermoplastic.

In some embodiments, the core structure including the first polymer material is PPE, a copolymer of PPE, or a composite with PPE as a matrix material. The PPE is a high-temperature thermoplastic, and is also known as PPO. The PPO is an amorphous thermoplastic polymer.

In some embodiments, the core structure including the first polymer material is LCP, a copolymer of LCP, or a composite with LCP as a matrix material. The LCP, also known as liquid crystalline polymer, is a novel polymer material that generally becomes a liquid crystal under a specified heating state.

In some embodiments, the shell structure including the second polymer material is a polyolefin, a copolymer of a polyolefin, or a composite with a polyolefin as a matrix material. The polyolefin is a polymer compound produced through addition polymerization of olefins. Such an organic polymer is typically produced through polymerization of many simple olefin molecules (α-olefins such as ethylene, propylene, 1-butene, 1-pentene, 1-hexene, 1-octene, and 4-methyl-1-pentene, and some cyclic olefins) that are the same or different. Common polyolefins include PE, poly(1-butene), or the like. The polyolefin is mainly produced through high-pressure polymerization, low-pressure polymerization (including a solution method, a slurry method, a bulk method, and a gas phase method), or the like. Common thermoplastic polyolefins include: PE, PP, PMP, PB-1, or the like; and POEs: PIB, EPR, EPDM, or the like. In some embodiments of the present application, a polyolefin material refers to a material in which a polymer prepared through polymerization or copolymerization of one or more olefins serves as a matrix.

In some embodiments, the shell structure including the second polymer material is PA, a copolymer of PA, or a composite with PA as a matrix material. The PA is a polymer synthesized by polymerization of a monomer including carboxyl and amino through amide bonds.

In some embodiments, the PA is commonly known as nylon. Nylon usually refers to a condensation polymer in which constituent units may be linked through amides. For example, in the present application, the nylon may be one or more selected from the group consisting of the following: nylon 6, a nylon 6 elastomer, nylon 66, a binary nylon 66/6 copolymer, nylon 11, a nylon 11 elastomer, nylon 12, a nylon 12 elastomer, nylon 1010, nylon 1012, and nylon 610. The nylon 6 elastomer is a block copolymer with nylon 6 as a hard segment and a polyether or polyester as a soft segment. The nylon 11 elastomer is a block copolymer with nylon 11 as a hard segment and a polyether or polyester as a soft segment. The nylon 12 elastomer is a block copolymer with nylon 12 as a hard segment and a polyether or polyester as a soft segment. For example, the nylon 6 has the following chemical structure:

Nylon 6

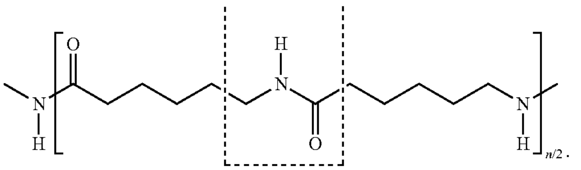

The nylon 66 has the following chemical structure:

Nylon 6-6

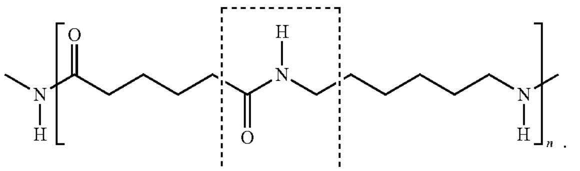

The nylon 12 (polydodecalactam) has the following chemical structure:$—[NH—(CH_2)_{11}—CO]_n]—$.

In some embodiments, the shell structure including the second polymer material is a polyester material, a copolymer of a polyester material, or a composite with a polyester material as a matrix material. The polyester is a general term for polymers produced through polycondensation of polyols and polyacids. The polyester mainly refers to PET, and customarily also includes linear thermoplastic resins such as PBT and polyarylester.

In some embodiments, a printing temperature of the 3D printing wire is in a range of 150° C. to 400° C. In an embodiment, the "printing temperature" refers to a temperature set for printing.

In some embodiments, a printing temperature of the 3D printing wire is in a range of 180° C. to 320° C. Preferably, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the core structure including the first polymer material in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure including the second polymer material in the 3D printing wire can be obtained according to the calculation of the diameter of the core structure including the first polymer material.

In summary, the 3D printing wire described in the third aspect of the present application is a 3D printing wire with a core-shell structure. A shell structure including a second polymer material is wrapped around a core structure including a first polymer material and a $T_g$ value of the core structure including the first polymer material is higher than a $T_g$ value of the shell structure including the second polymer material, which can effectively improve the warpage in printing with a high-$T_g$ material while maintaining or even improving the interlayer bonding of a printed object.

The fourth aspect of the present application provides a method for preparing a 3D printing wire, including the following step: first polymer material 100' and second polymer material 111' are co-extruded to produce the 3D printing wire 10 with a core-shell structure, where the 3D printing wire with the core-shell structure includes a shell structure formed by the second polymer material 111' and core structure 100 formed by the first polymer material 100'.

In an embodiment, as shown in FIG. 2 illustrating a schematic diagram of an apparatus for preparing a 3D printing wire structure in the embodiment of the present application, the step of co-extruding the first polymer material 100' and the second polymer material 111' to produce the 3D printing wire with the core-shell structure includes the following steps: A particle or powder including the first polymer material 100' is placed in first melt-extrusion device 21, and a particle or powder including the second polymer material 111' is placed in second melt-extrusion device 22. Through the first melt-extrusion device 21, the first polymer material 100' is melted, extruded, and drawn to produce core wire 100. Through the second melt-extrusion device 22, the second polymer material 111' is melted and extruded to wrap the core wire 100, drawing is conducted to produce wire 10, and the wire is cooled to produce the 3D printing wire 10 with the core-shell structure. In an embodiment, the $T_g$ refers to a temperature at which a glassy substance is reversible between a glassy state and a highly-elastic state. In an embodiment, the first melt-extrusion device 21 and the second melt-extrusion device 22 both are a single-screw extruder, and melts of the two materials are extruded through a same die for molding by metrologically controlling extrusion flow rates.

As described in the embodiment shown in FIG. 2, in the method for preparing a 3D printing wire in the present application, through a multi-layer co-extrusion apparatus/process, two materials with different characteristics are added to two single-screw extruders, respectively, and extrusion flow rates are controlled metrologically, such that the melts of the first polymer material and the second polymer material are extruded through the same die for molding to obtain a double-layer composite wire of the above two materials, namely, the 3D printing wire with the core-shell structure.

In an embodiment, the $T_g$ refers to a temperature at which a glassy substance is reversible between a glassy state and a highly-elastic state. It should be understood that $T_g$ of a polymer material is one of characteristic temperatures of the polymer material, and corresponds to a temperature at which molecular chain segments begin to move during a heating process for the polymer material. There are many methods to measure $T_g$ by measuring physical property changes during a glass transition process of a polymer material, which usually include the following 4 types: a volume change (a dilatometer method), thermodynamic property (DTA and DSC) and mechanical property (a thermomechanical method, a stress relaxation method, and a dynamic mechanical relaxation method (DMA)) changes, and an electromagnetic effect (a dielectric relaxation method). $T_g$ values measured by different measurement methods are different and are not generally comparable. Therefore, the description of $T_g$ values in the present application refers to the comparison of $T_g$ values measured by the same measurement method under the same measurement conditions.

In an embodiment of the present application, the $T_g$ value of the first polymer material is higher than the $T_g$ value of the second polymer material.

In the above embodiment, the core structure including the first polymer material is a material with high $T_g$, and the shell structure including the second polymer material is a material with low $T_g$. It should be understood that the high $T_g$ and the low $T_g$ are relative concepts, and there is a different between the two.

In another embodiment of the present application, the $T_g$ value of the first polymer material is lower than the $T_g$ value of the second polymer material. In an embodiment, the core structure including the first polymer material is a material with low $T_g$, and the shell structure including the second polymer material is a material with high $T_g$. In some embodiments, a $T_g$ value of the core structure including the first polymer material or the shell structure including the second polymer material is in a range of −50° C. to 380° C.

Preferably, the $T_g$ value of the core structure including the first polymer material or the shell structure including the second polymer material is in a range of 0° C. to 300° C.

In some embodiments, a $T_g$ value of the core structure including the first polymer material is in a range of 40° C. to 200° C. (such as 40° C. to 200° C., 50° C. to 200° C., 60° C. to 200° C., 70° C. to 200° C., 80° C. to 200° C., 90° C. to 200° C., 100° C. to 200° C., 110° C. to 200° C., 120° C. to 200° C., 130° C. to 200° C., 140° C. to 200° C., 150° C. to 200° C., 160° C. to 200° C., 170° C. to 200° C., 180° C. to 200° C., or 190° C. to 200° C.).

In some embodiments, a $T_g$ value of the shell structure including the second polymer material is in a range of 40° C. to 200° C. (such as 40° C. to 200° C., 50° C. to 200° C., 60° C. to 200° C., 70° C. to 200° C., 80° C. to 200° C., 90° C. to 200° C., 100° C. to 200° C., 110° C. to 200° C., 120° C. to 200° C., 130° C. to 200° C., 140° C. to 200° C., 150° C. to 200° C., 160° C. to 200° C., 170° C. to 200° C., 180° C. to 200° C., or 190° C. to 200° C.).

As described in the above embodiment, the $T_g$ value of the core structure including the first polymer material is higher than the $T_g$ value of the shell structure including the second polymer material. In an embodiment, a difference between the $T_g$ value of the core structure including the first polymer material and the $T_g$ value of the shell structure including the second polymer material is in a range of 1° C. to 350° C. (such as 1° C. to 350° C., 20° C. to 350° C., 40° C. to 350° C., 60° C. to 350° C., 80° C. to 350° C., 100° C. to 350° C., 120° C. to 350° C., 140° C. to 350° C., 160° C. to 350° C., 180° C. to 350° C., 200° C. to 350° C., 220° C. to 350° C., 240° C. to 350° C., 260° C. to 350° C., 280° C. to 350° C., 300° C. to 350° C., 320° C. to 350° C., or 340° C. to 350° C.).

Preferably, the difference between the $T_g$ value of the core structure including the first polymer material and the $T_g$ value of the shell structure including the second polymer material is in a range of 1° C. to 300° C. (such as 1° C. to 300° C., 10° C. to 300° C., 20° C. to 300° C., 30° C. to 300° C., 40° C. to 300° C., 50° C. to 300° C., 60° C. to 300° C., 70° C. to 300° C., 80° C. to 300° C., 90° C. to 300° C., 100° C. to 300° C., 110° C. to 300° C., 120° C. to 300° C., 130° C. to 300° C., 140° C. to 300° C., 150° C. to 300° C., 160° C. to 300° C., 170° C. to 300° C., 180° C. to 300° C., 190° C. to 300° C., 200° C. to 300° C., 210° C. to 300° C., 220° C. to 300° C., 230° C. to 300° C., 240° C. to 300° C., 250° C. to 300° C., 260° C. to 300° C., 270° C. to 300° C., 280° C. to 300° C., or 290° C. to 300° C.).

More specifically, the difference between the $T_g$ value of the core structure including the first polymer material and the $T_g$ value of the shell structure including the second polymer material is in a range of 1° C. to 200° C. (such as 1° C. to 200° C., 5° C. to 200° C., 10° C. to 200° C., 15° C. to 200° C., 20° C. to 200° C., 25° C. to 200° C., 30° C. to 200° C., 35° C. to 200° C., 40° C. to 200° C., 45° C. to 200° C., 50° C. to 200° C., 55° C. to 200° C., 60° C. to 200° C., 65° C. to 200° C., 70° C. to 200° C., 75° C. to 200° C., 80° C. to 200° C., 85° C. to 200° C., 90° C. to 200° C., 95° C. to 200° C., 100° C. to 200° C., 105° C. to 200° C., 110° C. to 200° C., 115° C. to 200° C., 120° C. to 200° C., 125° C. to 200° C., 130° C. to 200° C., 135° C. to 200° C., 140° C. to 200° C., 145° C. to 200° C., 150° C. to 200° C., 155° C. to 200° C., 160° C. to 200° C., 165° C. to 200° C., 170° C. to 200° C., 175° C. to 200° C., 180° C. to 200° C., 185° C. to 200° C., 190° C. to 200° C., or 195° C. to 200° C.).

The 3D printing wire includes a core structure including a first polymer material and a shell structure that is wrapped around the core structure and includes a second polymer material, where the core structure and the shell structure can be in different mixing volume ratios.

In some other embodiments, a volume fraction of the core structure including the first polymer material in the entire 3D printing wire is in a range of 10% to 90% (such as 10% to 90%, 15% to 90%, 20% to 90%, 25% to 90%, 30% to 90%, 35% to 90%, 40% to 90%, 45% to 90%, 50% to 90%, 55% to 90%, 60% to 90%, 65% to 90%, 70% to 90%, 75% to 90%, 80% to 90%, or 85% to 90%).

In some embodiments, the core structure including the first polymer material includes a PC material, a copolymer of a PC material, or a composite with a PC material as a matrix material. The PC, also known as PC plastic, is a polymer with a carbonate group in a molecular chain. According to structures of ester groups, the PC can include aliphatic PC, aromatic PC, aliphatic-aromatic PC, or the like.

In some embodiments, the core structure including the first polymer material is a PSF material, a copolymer of a PSF material, or a composite with a PSF material as a matrix material. The PSF refers to a thermoplastic polymer material with hydrocarbyl-$SO_2$-hydrocarbyl structural units in a structure.

In some embodiments, the core structure including the first polymer material is PEEK, a copolymer of PEEK, or a composite with PEEK as a matrix material. The PEEK is a linear aromatic polymer compound consisting of oxy-p-phenylene-carbonyl-p-phenylene units. The PEEK is a semi-crystalline thermoplastic.

In some embodiments, the core structure including the first polymer material is PPE, a copolymer of PPE, or a composite with PPE as a matrix material. The PPE is a high-temperature thermoplastic, and is also known as PPO. The PPO is an amorphous thermoplastic polymer.

In some embodiments, the core structure including the first polymer material is LCP, a copolymer of LCP, or a composite with LCP as a matrix material. The LCP, also known as liquid crystalline polymer, is a novel polymer material that generally becomes a liquid crystal under a specified heating state.

In some embodiments, the shell structure including the second polymer material is a polyolefin, a copolymer of a polyolefin, or a composite with a polyolefin as a matrix material. The polyolefin is a polymer compound produced through addition polymerization of olefins. Such an organic polymer is typically produced through polymerization of many simple olefin molecules (α-olefins such as ethylene, propylene, 1-butene, 1-pentene, 1-hexene, 1-octene, and 4-methyl-1-pentene, and some cyclic olefins) that are the same or different. Common polyolefins include PE, poly(1-butene), or the like. The polyolefin is mainly produced through high-pressure polymerization, low-pressure polymerization (including a solution method, a slurry method, a bulk method, and a gas phase method), or the like. Common thermoplastic polyolefins include: PE, PP, PMP, PB-1, or the like; and POEs: PIB, EPR, EPDM, or the like. In some embodiments of the present application, a polyolefin material refers to a material in which a polymer prepared through polymerization or copolymerization of one or more olefins serves as a matrix.

In some embodiments, the shell structure including the second polymer material is PA, a copolymer of PA, or a composite with PA as a matrix material. The PA is a polymer synthesized by polymerization of a monomer including carboxyl and amino through amide bonds.

In some embodiments, the PA is commonly known as nylon. Nylon usually refers to a condensation polymer in which constituent units may be linked through amides. For example, in the present application, the nylon may be one or more selected from the group consisting of the following: nylon 6, a nylon 6 elastomer, nylon 66, a binary nylon 66/6 copolymer, nylon 11, a nylon 11 elastomer, nylon 12, a nylon 12 elastomer, nylon 1010, nylon 1012, and nylon 610. The nylon 6 elastomer is a block copolymer with nylon 6 as a hard segment and a polyether or polyester as a soft segment. The nylon 11 elastomer is a block copolymer with nylon 11 as a hard segment and a polyether or polyester as a soft segment. The nylon 12 elastomer is a block copolymer with nylon 12 as a hard segment and a polyether or polyester as a soft segment. For example, the nylon 6 has the following chemical structure:

Nylon 6

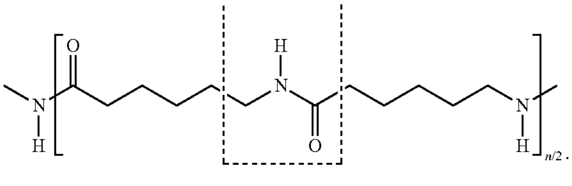

.

The nylon 66 has the following chemical structure:

Nylon 6-6

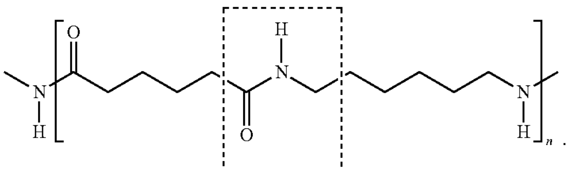

The nylon 12 (polydodecalactam) has the following chemical structure:—$[NH—(CH_2)_{11}—CO]_n$]—.

In some embodiments, the shell structure including the second polymer material is a polyester material, a copolymer of a polyester material, or a composite with a polyester material as a matrix material. The polyester is a general term for polymers produced through polycondensation of polyols and polyacids. The polyester mainly refers to PET, and customarily also includes linear thermoplastic resins such as PBT and polyarylester.

In some embodiments, a printing temperature of the 3D printing wire is in a range of 150° C. to 400° C. In an embodiment, the "printing temperature" refers to a temperature set for printing.

In some embodiments, a printing temperature of the 3D printing wire is in a range of 180° C. to 320° C. Preferably, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the core structure including the first polymer material in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure including the second polymer material in the 3D printing wire can be obtained according to the calculation of the diameter of the core structure including the first polymer material.

In summary, in the method for preparing a 3D printing wire described in the fourth aspect of the present application, the 3D printing wire with the core-shell structure is produced by co-extruding a first polymer material and a second polymer material, and in the 3D printing wire with the core-shell structure, a shell structure formed by the second polymer material is wrapped around a core structure formed by the first polymer material. A $T_g$ value of the core structure including the first polymer material is higher than a $T_g$ value of the shell structure including the second polymer material, which can effectively improve the warpage in printing with a high-$T_g$ material while maintaining or even improving the interlayer bonding of a printed object. In the present application, a wire with a continuous multi-layer structure is prepared through the melting and multi-layer co-extrusion of a plurality of materials, so as to allow a continuous multi-phase morphological structure in a printed object.

Example and comparative example of the 3D printing wires described in the third aspect and the fourth aspect:

EXAMPLE

In this example, a 3D printing wire CSF-TPU/PLA with a core-shell structure produced by co-extruding a first polymer material and a second polymer material was provided. The first polymer material as a material for a core structure was TPU with a $T_g$ value of −25° C. and a volume fraction of 40 vol %. The second polymer material as a material for a shell structure was PLA with a $T_g$ value of 64° C. and a volume fraction of 60 vol %.

In this example, a method for preparing the 3D printing wire with the core-shell structure was as follows: The first polymer material of TPU was placed in a first melt-extrusion device, and a second polymer material of PLA was placed in a second melt-extrusion device. Through the first melt-extrusion device, the first polymer material was melted, extruded, and drawn to produce a core wire. Through the second melt-extrusion device, the second polymer material was melted and extruded to wrap the core wire, drawing was conducted to produce a wire, and the wire was cooled to produce the 3D printing wire with the core-shell structure.

In this example, the prepared 3D printing wire with the core-shell structure was subjected to a printing test, and standard mechanical property test sample strips were printed under the following printing conditions: a printing temperature: 210° C.; a printing speed: 50 mm/s; a printing filling degree: 100%; and a printing fan cooling ratio: 100%. As shown in FIG. 6 to FIG. 8, FIG. 6 is a schematic diagram of X-Y axis stretching of a sample strip on a member platform of a printing apparatus in a test example, FIG. 7 is a schematic diagram of Z axis stretching of a sample strip on a member platform of a printing apparatus in a test example, and FIG. 8 is a schematic diagram of printing of bending and impact sample strips on a member platform of a printing apparatus in a test example.

In the test example, the 3D printing wire with the core-shell structure was subjected to a mechanical property test. Table 3 shows the mechanical properties of printing of the composite wire with the TPU/PLA core-shell structure.

TABLE 3

| Mechanical properties | Test results | Test standards |
|---|---|---|
| X-Y tensile strength | 45.2 ± 0.8 MPa | GB/T 1040 |
| Z tensile strength | 33.6 ± 1.3 MPa | GB/T 1040 |
| X-Y bending strength | 56.7 ± 1.2 MPa | GB/T 9341 |
| Notched izod impact strength | 20.3 ± 1.5 $KJ/m^2$ | GB/T 1043 |

Comparative Example

Processing of a blended composite wire: The traditional process route for blending modification (that is, the core-shell structure of the present application was not adopted) was adopted to prepare a blended alloy wire with the same PLA and TPU materials in the same volume fraction ratio as in the example. That is, TPU in a volume fraction of 40 vol % and PLA in a volume fraction of 60 vol % were subjected to twin-screw blending modification and granulation and then to single-screw extrusion to prepare a 3D printing wire with a processing temperature of 150° C. to 220° C.

Wire printing test: Test sample strips were printed under the same printing conditions as in the example.

Mechanical property test: The mechanical property test was conducted under the same mechanical property test standards and the same test conditions as in the example, and corresponding test results were compared. Table 4 shows the mechanical properties of printing of the PLA/TPU blended composite wire.

TABLE 4

| Mechanical properties | Test results | Test standards |
|---|---|---|
| X-Y tensile strength | 25.1 ± 0.3 MPa | GB/T 1040 |
| Z tensile strength | 12.5 ± 0.9 MPa | GB/T 1040 |
| X-Y bending strength | 36.4 ± 1.1 MPa | GB/T 9341 |
| Notched izod impact strength | 14.3 ± 0.7 $KJ/m^2$ | GB/T 1043 |

According to Table 3 and Table 4: Mechanical properties of printing of a wire with a core-shell structure and a blended composite wire that have the same chemical component contents of the TPU/PLA materials are compared, and it can be known that a printed object of the wire with a core-shell structure in the present application has better mechanical properties than a printed object of the blended composite wire as a whole. The wire with a core-shell structure has an improved strength and impact toughness. In addition, the wire with a core-shell structure has significantly-better Z-axis tensile properties than the blended wire, and solves the technical pain point of weakening of bonding between printed layers caused by the traditional blending modification technology.

[006 Case]

The application of the existing melt blending-based modification technology in the technical field of extrusion 3D printing is still faced with some common problems, such as weakening of bonding between printed layers caused by a dispersed multi-phase structure in a wire when the existing melt blending-based modification technology is used for extrusion 3D printing. There are often contradictions between the printability and end-use of a material, which cannot be deeply optimized by the general modification technology. Because the wire in the prior art is soft itself, the wire cannot be smoothly extruded due to weak rigidity of a surface of the wire, such that a printing efficiency is often affected by the blockage of a printhead or the non-smooth printing. Accordingly, the present application also provides a 3D printing wire in a fifth aspect and a method for preparing a 3D printing wire in a sixth aspect, so as to solve the technical problem that a printing efficiency is often affected by the blockage of a printhead or the non-smooth printing caused by the failed smooth extrusion due to weak rigidity of the entire wire and the slippage of a fed wire due to strong surface rigidity of a wire in the prior art.

The fifth aspect of the present application provides a 3D printing wire. The 3D printing wire can be used in a 3D printing apparatus based on FDM, namely, an FDM apparatus, such that the 3D printing wire of the present application is laid layer by layer along a preset printing path to allow 3D printing to obtain a 3D object. FIG. 1 is a schematic structural diagram of the 3D printing wire of the present application. As shown in this figure, the 3D printing wire includes core structure 100 and shell structure 111 wrapped around the core structure 100. The core structure 100 includes a first polymer material and the shell structure 111 includes a second polymer material.

In an embodiment of the present application, a tensile elastic modulus of the first polymer material is different from a tensile elastic modulus of the second polymer material. For example, in an embodiment, the tensile elastic modulus of the first polymer material is smaller than the tensile elastic modulus of the second polymer material. For example, in another embodiment, the tensile elastic modulus of the first polymer material is larger than the tensile elastic modulus of the second polymer material.

In the following embodiments of the present application, the tensile elastic modulus of the first polymer material is larger than the tensile elastic modulus of the second polymer material. In the present application, a tensile elastic modulus of a polymer material is an important method and performance parameter to characterize the rigidity of the polymer material. A tensile elastic modulus is determined through a tensile test of a standard sample strip, and a size of the sample strip and test conditions all will affect a test result to some extent. Therefore, the tensile elastic modulus values of the core and shell polymer materials provided for comparison in the present application are determined with the same test method standard, sample strip size, and test conditions (tensile rate). With reference to the standards GB/T 1040-2018 and ISO 527:2012, a test method is conducted with a tensile test speed of 1 mm/min.

It should be understood that a tensile modulus of a solid material can characterize the mechanical property of rigidness of the solid material. The tensile modulus is defined as a ratio of a tensile stress (per unit area) to a strain (relative deformation) during an elastic deformation. In some cases, the tensile modulus can be used to evaluate the rigidity of a material. In other words, when subjected to a specific load, a material is expected to deform (elastic). The higher the tensile modulus of a material, the larger the force required for deformation. The tensile elastic modulus can also be called tensile modulus, and refers to the elasticity of a material during stretching. In some cases, a value of a tensile modulus is a ratio of a force required for stretching a material along a central axis by a unit length to a cross-sectional area of the material. In an application, a calculation formula for the tensile modulus is as follows: tensile modulus (N/(m×m))=f/S (N/(m×m)), where f represents a required force, S represents a cross-sectional area of a material, and N represents a required force.

As described in the 3D printing wire of the present application, in an embodiment, the tensile elastic modulus of the first polymer material for the core structure 100 is greater than the tensile elastic modulus of the second polymer material for the shell structure 111. In an embodiment, the tensile elastic modulus of the first polymer material is greater than or equal to 1 Gpa, and the tensile elastic modulus of the second polymer material is less than 1 Gpa.

In some other embodiments, a mixing volume fraction of the first polymer material in the 3D printing wire is in a range of 5% to 97%, that is, the mixing volume fraction of the first polymer material of the 3D printing wire in the entire 3D printing wire is in a range of 5% to 97% (such as 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, or 97%).

In some embodiments, the second polymer material includes a thermoplastic elastomer, a rubber soft material, or a composite with a thermoplastic elastomer and a rubber soft material as matrix resins.

In some embodiments, the thermoplastic elastomer includes a composite of one or more of TPU, a styrene-butadiene-styrene (SBS) thermoplastic elastomer, a polyolefin thermoplastic elastomer (POE), a polyamide elastomer (PAE), or a composite with a polymer material as a matrix resin. For example, the TPU is a (AB), block linear polymer, where A represents a polyester or polyether with a high molecular weight (1,000 to 6,000), B represents a diol including 2 to 12 straight-chain carbon atoms, and a chemical structure between AB chain segments is diisocyanate.

In some embodiments, the thermoplastic elastomer includes one or more of TPU, an SBS thermoplastic elastomer, POE, PAE, or a composite with a polymer material as a matrix resin.

In some embodiments, the rubber soft material includes one or more of a natural rubber, a synthetic rubber of two or more of a styrene-butadiene rubber, EPR, a nitrile butadiene rubber, a silicone rubber, and a fluorine rubber, or a composite with a polymer material as a matrix resin.

In some embodiments, the first polymer material includes one or more of a thermoplastic polymer material, a polymer material including a polyolefin, PA, a polyester, and PC, or a composite with a polymer material as a matrix resin.

In some embodiments, the tensile elastic modulus of the first polymer material is greater than or equal to 1 Gpa, and the tensile elastic modulus of the second polymer material is less than 1 Gpa. In some other embodiments, the first polymer material for the core structure is a composite of one or more of a styrene-butadiene rubber, EPR, and a silicone rubber that have a tensile elastic modulus of greater than 1 Gpa. The second polymer material for the shell structure is a composite of one or more of a thermoplastic polymer material and a composite thereof, and polyolefin, PA, and polyester materials that have a tensile elastic modulus of less than 1 Gpa.

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the core structure including the first polymer material in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure including the second polymer material in the 3D printing wire can be obtained according to the calculation of the diameter of the core structure including the first polymer material.

In some embodiments, a printing temperature of the 3D printing wire is in a range of 120° C. to 400° C. The "printing temperature" refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In summary, the 3D printing wire with the core-shell structure described in the fifth aspect of the present application includes a shell structure formed by a second polymer material and a core structure formed by a first polymer material. A tensile elastic modulus of the first polymer material is larger than a tensile elastic modulus of the second polymer material, which effectively improves the overall rigidity of the wire without reducing the surface hardness of the wire, namely, improving the overall rigidity of the wire. As a result, the extrusion conveyability of the soft elastomer material during a printing process is improved and the slippage of a fed wire is avoided, such that the convey of the wire by a printhead during 3D printing is smooth, which is conducive to improving a printing efficiency.

The sixth aspect of the present application provides a method for preparing a 3D printing wire, including the following step: a first polymer material and a second polymer material are co-extruded to produce the 3D printing wire with a core-shell structure, where in the 3D printing wire with the core-shell structure, a shell structure formed by the second polymer material is wrapped around a core structure formed by the first polymer material.

In an embodiment, as shown in FIG. 2 illustrating a schematic diagram of an apparatus for preparing a 3D printing wire structure in the embodiment of the present application, the step of co-extruding the first polymer material and the second polymer material to produce the 3D printing wire with the core-shell structure includes the following steps: A particle or powder including the first polymer material 100' is placed in first melt-extrusion device 21, and a particle or powder including the second polymer material 111' is placed in second melt-extrusion device 22.

Through the first melt-extrusion device 21, the first polymer material 100' is melted, extruded, and drawn to produce core wire. Through the second melt-extrusion device 22, the second polymer material 111' is melted and extruded to wrap the core wire 100, drawing is conducted to produce wire 10, and the wire is cooled to produce the 3D printing wire 10 with the core-shell structure.

In an embodiment, the first melt-extrusion device 21 and the second melt-extrusion device 22 both are a single-screw extruder, and melts of the two materials are extruded through a same die for molding by metrologically controlling extrusion flow rates.

As described in the embodiment shown in FIG. 2, in the method for preparing a 3D printing wire in the present application, through a multi-layer co-extrusion apparatus/process, two materials with different characteristics are added to two single-screw extruders, respectively, and extrusion flow rates are controlled metrologically, such that the melts of the first polymer material 100' and the second polymer material 111' are extruded through the same die for molding to obtain a double-layer composite wire of the above two materials, namely, the 3D printing wire with the core-shell structure.

In an embodiment of the present application, a tensile elastic modulus of the first polymer material is different from a tensile elastic modulus of the second polymer material. For example, in an embodiment, the tensile elastic modulus of the first polymer material is smaller than the tensile elastic modulus of the second polymer material. For example, in another embodiment, the tensile elastic modulus of the first polymer material is larger than the tensile elastic modulus of the second polymer material.

In the following embodiments of the present application, the tensile elastic modulus of the first polymer material is larger than the tensile elastic modulus of the second polymer material. In the present application, a tensile elastic modulus of a polymer material is an important method and performance parameter to characterize the rigidity of the polymer material. A tensile elastic modulus is determined through a tensile test of a standard sample strip, and a size of the sample strip and test conditions all will affect a test result to some extent. Therefore, the tensile elastic modulus values of the core and shell polymer materials provided for comparison in the present disclosure are determined with the same test method standard, sample strip size, and test conditions (tensile rate). With reference to the standards GB/T 1040-2018 and ISO 527:2012, a test method is conducted with a tensile test speed of 1 mm/min.

It should be understood that a tensile modulus of a solid material can characterize the mechanical property of rigidness of the solid material. The tensile modulus is defined as a ratio of a tensile stress (per unit area) to a strain (relative deformation) during an elastic deformation. In some cases, the tensile modulus can be used to evaluate the rigidity of a material. In other words, when subjected to a specific load, a material is expected to deform (elastic). The higher the tensile modulus of a material, the larger the force required for deformation. The tensile elastic modulus can also be called tensile modulus, and refers to the elasticity of a material during stretching. In some cases, a value of a tensile modulus is a ratio of a force required for stretching a material along a central axis by a unit length to a cross-sectional area of the material. In an application, a calculation formula for the tensile modulus is as follows: tensile modulus (N/(m×m))=f/S (N/(m×m)), where f represents a required force, S represents a cross-sectional area of a material, and N represents a required force.

As described in the 3D printing wire of the present application, in an embodiment, the tensile elastic modulus of the first polymer material for the core structure 100 is greater than the tensile elastic modulus of the second polymer material for the shell structure 111. In an embodiment, the tensile elastic modulus of the first polymer material is greater than or equal to 1 Gpa, and the tensile elastic modulus of the second polymer material is less than 1 Gpa.

In some other embodiments, a mixing volume fraction of the first polymer material in the 3D printing wire is in a range of 5% to 97%, that is, the mixing volume fraction of the first polymer material of the 3D printing wire in the entire 3D printing wire is in a range of 5% to 97% (such as 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, or 97%).

In some embodiments, the second polymer material includes a thermoplastic elastomer, a rubber soft material, or a composite with a thermoplastic elastomer and a rubber soft material as matrix resins.

In some embodiments, the thermoplastic elastomer includes a composite of one or more of TPU, an SBS thermoplastic elastomer, POE, PAE, or a composite with a polymer material as a matrix resin. For example, the TPU is a $(AB)_n$ block linear polymer, where A represents a polyester or polyether with a high molecular weight (1,000 to 6,000), B represents a diol including 2 to 12 straight-chain carbon atoms, and a chemical structure between AB chain segments is diisocyanate.

In some embodiments, the thermoplastic elastomer includes one or more of TPU, an SBS thermoplastic elastomer, POE, PAE, or a composite with a polymer material as a matrix resin.

In some embodiments, the rubber soft material includes one or more of a natural rubber, a synthetic rubber of two or more of a styrene-butadiene rubber, EPR, a nitrile butadiene rubber, a silicone rubber, and a fluorine rubber, or a composite with a polymer material as a matrix resin.

In some embodiments, the first polymer material includes one or more of a thermoplastic polymer material, a polymer material including a polyolefin, PA, a polyester, and PC, or a composite with a polymer material as a matrix resin.

In some embodiments, the tensile elastic modulus of the first polymer material is greater than or equal to 1 Gpa, and the tensile elastic modulus of the second polymer material is less than 1 Gpa. In some other embodiments, the first polymer material for the core structure is a composite of one or more of a styrene-butadiene rubber, EPR, and a silicone rubber that have a tensile elastic modulus of greater than 1 Gpa. The second polymer material for the shell structure is a composite of one or more of a thermoplastic polymer material and a composite thereof, and polyolefin, PA, and polyester materials that have a tensile elastic modulus of less than 1 Gpa.

In some embodiments, an average diameter of the 3D printing wire is 1.55 mm to 1.95 mm (such as 1.55 mm, 1.56 mm, 1.57 mm, 1.58 mm, 1.59 mm, 1.60 mm, 1.61 mm, 1.62 mm, 1.63 mm, 1.64 mm, 1.65 mm, 1.66 mm, 1.67 mm, 1.68 mm, 1.69 mm, 1.70 mm, 1.71 mm, 1.72 mm, 1.73 mm, 1.74 mm, 1.75 mm, 1.76 mm, 1.77 mm, 1.78 mm, 1.79 mm, 1.80 mm, 1.81 mm, 1.82 mm, 1.83 mm, 1.84 mm, 1.85 mm, 1.86 mm, 1.87 mm, 1.88 mm, 1.89 mm, 1.90 mm, 1.91 mm, 1.92 mm, 1.93 mm, 1.94 mm, or 1.95 mm).

In some other embodiments, the average diameter of the 3D printing wire is 2.65 mm to 3.15 mm (such as 2.65 mm, 2.66 mm, 2.67 mm, 2.68 mm, 2.69 mm, 2.70 mm, 2.71 mm, 2.72 mm, 2.73 mm, 2.74 mm, 2.75 mm, 2.76 mm, 2.77 mm, 2.78 mm, 2.79 mm, 2.80 mm, 2.81 mm, 2.82 mm, 2.83 mm, 2.84 mm, 2.85 mm, 2.86 mm, 2.87 mm, 2.88 mm, 2.89 mm, 2.90 mm, 2.91 mm, 2.92 mm, 2.93 mm, 2.94 mm, 2.95 mm, 2.96 mm, 2.97 mm, 2.98 mm, 2.99 mm, 3.00 mm, 3.01 mm, 3.02 mm, 3.03 mm, 3.04 mm, 3.05 mm, 3.06 mm, 3.07 mm, 3.08 mm, 3.09 mm, 3.10 mm, 3.11 mm, 3.12 mm, 3.13 mm, 3.14 mm, or 3.15 mm).

In some embodiments, a diameter of the core structure including the first polymer material in the 3D printing wire is 0.3 mm to 2.8 mm (such as 0.3 mm to 2.8 mm, 0.4 mm to 2.8 mm, 0.5 mm to 2.8 mm, 0.6 mm to 2.8 mm, 0.7 mm to 2.8 mm, 0.8 mm to 2.8 mm, 0.9 mm to 2.8 mm, 1.0 mm to 2.8 mm, 1.1 mm to 2.8 mm, 1.2 mm to 2.8 mm, 1.3 mm to 2.8 mm, 1.4 mm to 2.8 mm, 1.5 mm to 2.8 mm, 1.6 mm to 2.8 mm, 1.7 mm to 2.8 mm, 1.8 mm to 2.8 mm, 1.9 mm to 2.8 mm, 2.0 mm to 2.8 mm, 2.1 mm to 2.8 mm, 2.2 mm to 2.8 mm, 2.3 mm to 2.8 mm, 2.4 mm to 2.8 mm, 2.5 mm to 2.8 mm, 2.6 mm to 2.8 mm, or 2.7 mm to 2.8 mm), and correspondingly, when a diameter of the 3D printing wire is determined, a thickness of the shell structure including the second polymer material in the 3D printing wire can be obtained according to the calculation of the diameter of the core structure including the first polymer material.

In some embodiments, a printing temperature of the 3D printing wire is in a range of 120° C. to 400° C. The “printing temperature” refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

In summary, in the method for preparing a 3D printing wire described in the sixth aspect of the present application, the 3D printing wire with the core-shell structure is produced by co-extruding a first polymer material and a second polymer material, and in the 3D printing wire with the core-shell structure, a shell structure formed by the second polymer material is wrapped around a core structure formed by the first polymer material. A tensile elastic modulus of the first polymer material is larger than a tensile elastic modulus of the second polymer material, which effectively improves the overall rigidity of the wire without reducing the surface hardness of the wire, namely, improving the overall rigidity of the wire. As a result, the extrusion conveyability of the soft elastomer material during a printing process is improved and the slippage of a fed wire is avoided, such that the convey of the wire by a printhead during 3D printing is smooth, which is conducive to improving a printing efficiency.

Example and comparative example of the 3D printing wires described in the fifth aspect and the sixth aspect:

EXAMPLE

In this example, a 3D printing wire with a core-shell structure produced by co-extruding a first polymer material and a second polymer material was provided: PLA/TPU core-shell composite wire. The first polymer material as a material for a core structure was PLA with a tensile elastic modulus of 3,000 MPa to 5,000 MPa (GB/T 1040) and a volume fraction of 40 vol %. The second polymer material as a material for a shell structure was TPU with a tensile elastic modulus of 10 MPa to 50 MPa (GB/T 1040) and a volume fraction of 60 vol %.

In this example, a method for preparing the 3D printing wire with the core-shell structure was as follows: The first polymer material of PLA was placed in a first melt-extrusion device, and a second polymer material of TPU was placed in a second melt-extrusion device. Through the first melt-extrusion device, the first polymer material was melted, extruded, and drawn to produce a core wire. Through the second melt-extrusion device, the second polymer material was melted and extruded to wrap the core wire, drawing was conducted to produce a wire, and the wire was cooled to produce the 3D printing wire with the core-shell structure.

In this example, the prepared 3D printing wire with the core-shell structure was subjected to a printing test, and standard mechanical property test sample strips were printed under the following printing conditions: a printing temperature: 210° C.; a printing speed: 50 mm/s; a printing filling degree: 100%; and a printing fan cooling ratio: 100%. As shown in FIG. 6 and FIG. 7, FIG. 6 is a schematic diagram of X-Y axis stretching of a sample strip on a member platform of a printing apparatus in a test example, and FIG. 7 is a schematic diagram of Z axis stretching of a sample strip on a member platform of a printing apparatus in a test example.

In the test example, the 3D printing wire with the core-shell structure was subjected to a mechanical property test. Table 5 shows the mechanical properties of printing of the composite wire with the PLA/TPU core-shell structure.

TABLE 5

| Mechanical properties | Test results | Test standards |
|---|---|---|
| X-Y tensile strength | 25.2 ± 0.8 MPa | GB/T 1040 |
| X-Y tensile modulus | 1455.2 ± 25.3 MPa | GB/T 1040 |
| Z tensile strength | 18.5 ± 0.6 MPa | GB/T 1040 |

COMPARATIVE EXAMPLE

In this comparative example, the traditional process route for blending modification was adopted to prepare a PLA/TPU blended alloy wire with the same PLA and TPU materials in the same volume fraction ratio as in the example. That is, 60 vol % of TPU and 40 vol % of PLA were subjected to twin-screw blending modification and granulation and then to single-screw extrusion to prepare a 3D printing wire with a processing temperature of 150° C. to 220° C.

Wire printing test: Test sample strips were printed under the same printing conditions as in the example.

Mechanical property test: The mechanical property test was conducted under the same mechanical property test standards and the same test conditions as in the example, and corresponding test results were compared. Table 6 shows the mechanical properties of printing of the PLA/TPU blended composite wire.

TABLE 6

| Mechanical properties | Test results | Test standards |
|---|---|---|
| X-Y tensile strength | 20.3 ± 0.7 MPa | GB/T 1040 |
| X-Y tensile modulus | 821.2 ± 36.3 MPa | GB/T 1040 |
| Z tensile strength | 10.3 ± 0.8 MPa | GB/T 1040 |

According to Table 5 and Table 6: Mechanical properties of printing of a wire with a core-shell structure and a blended composite wire that have the same chemical component contents of the PLA/TPU materials are compared, and a printed object of the wire with a core-shell structure has a significantly-better strength and rigidity modulus than a printed object of the blended composite wire.

A seventh aspect of the present application provides a 3D printing method used for a 3D printing apparatus. In an embodiment, the 3D printing apparatus is a 3D printing apparatus based on FDM, namely, an FDM apparatus. The 3D printing apparatus can control a printhead to lay a wire material layer by layer along a preset printing path during a printing work to obtain a printed object.

Figure 3:
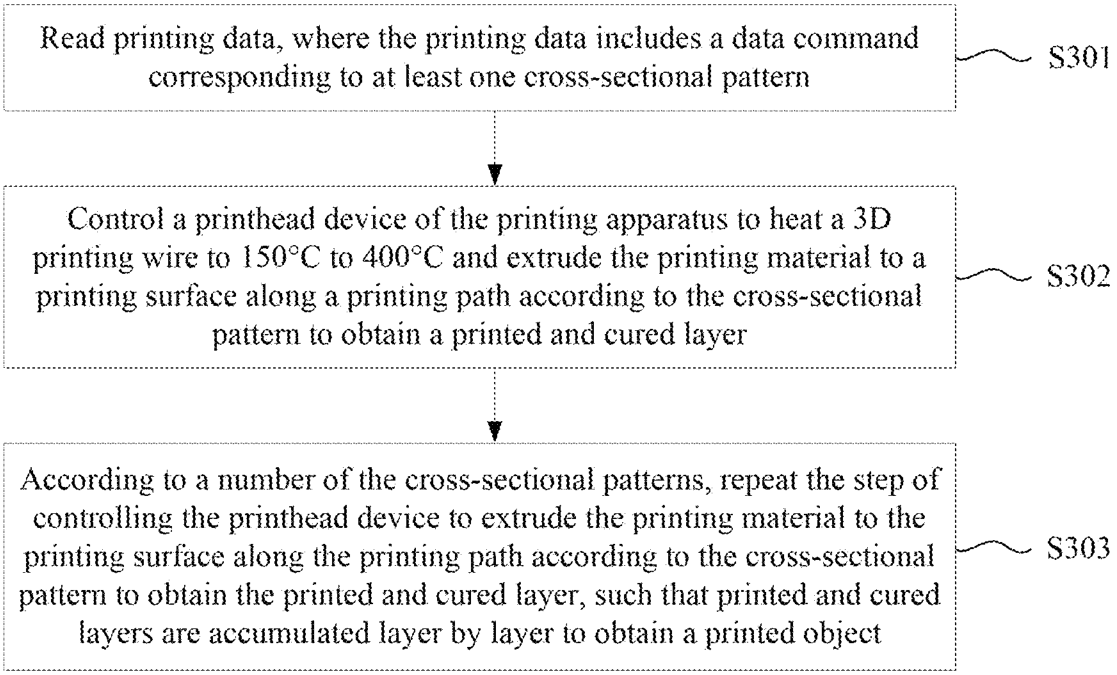
FIG. 3 is a flow chart of the 3D printing method of the present application in an embodiment.
Figure 4:
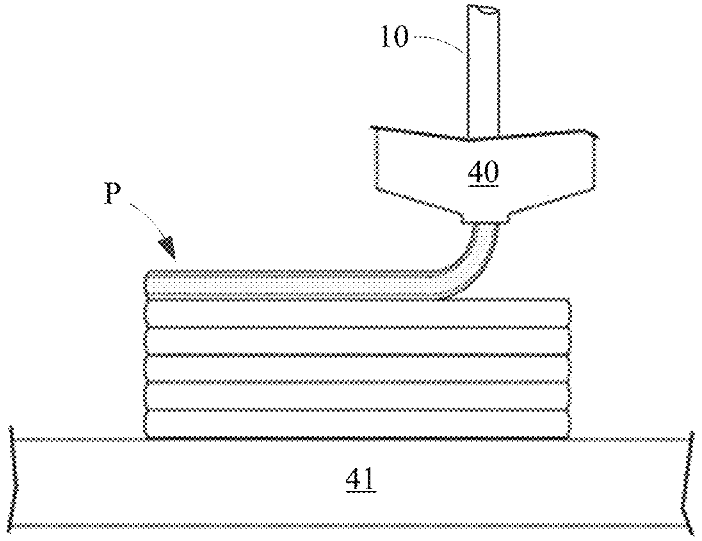
FIG. 4 is a schematic diagram of a printing state in the 3D printing method of the present application in an embodiment.

FIG. 3 is a flow chart of the 3D printing method of the present application in an embodiment, and FIG. 4 is a schematic diagram of a printing state in the 3D printing method of the present application in an embodiment. As shown in FIG. 3 and FIG. 4, the 3D printing method includes the following steps:

S301: Printing data is read by the 3D printing apparatus, where the printing data includes a data command corresponding to at least one cross-sectional layer. In an embodiment, the reading the printing data by the 3D printing apparatus refers to reading G-Code data of an object 3D model and printing information set, where the printing information includes attribute information of a printing material.

The object 3D model can be a 3D model of any design, and is generally a 3D model corresponding to an object entity to be 3D-printed, such as a mold model, a medical fixture model, and a customized product model such as a sole model or a tooth model. In some embodiments, for example, the object 3D model is converted into G-Code data or a 3D model represented by G-Code data is directly generated. For example, the object 3D model can be generated by computer-aided design (CAD) software. In practice, the software used to allow 3D modeling includes, but is not limited to, Autocad, Aurodesk123D, Tinkercad, Solidworks, Pro-E, Catia, Cimatron, Sketchup, OpenScad, UG, 3D max, maya, Rhino, Blender, or the like.

In an embodiment, the G-Code data is primarily a numerical control programming language, which can be represented by various versions in practice. Data of the object 3D model may be in any known format, including, but not limited to, a standard tessellation language (STL) or stereo lithography contour (SLC) format, a virtual reality modeling language (VRML) format, an additive manufacturing file (AMF) format, a drawing exchange format (DXF), a polygon file format (PLY), or any other format suitable for CAD.

In practice, the G-Code data includes a series of spatial coordinates with a sequential execution order. The G-Code data of the object 3D model is a 3D model expressed with coordinates in a time series or sequential order. For example, the G-Code data is input into a computing device with a processing function, such that the object 3D model is constructed along a path formed in accordance with an order of spatial coordinates of the G-Code data.

S302: Printhead device 40 of the printing apparatus is controlled to heat 3D printing wire 10 to 150° C. to 400° C. and extrude the printing material to a printing surface along a printing path according to the cross-sectional layer to obtain a printed and cured layer, where the 3D printing wire 10 is the 3D printing wire described in the first aspect or the third aspect or the fifth aspect. In some embodiments, a printing temperature of the 3D printing wire is in a range of 150° C. to 400° C. The "printing temperature" refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

S303: According to a number of the cross-sectional layers, the step of controlling the printhead device 40 to extrude the printing material to the printing surface 41 along the printing path according to the cross-sectional layer to obtain the printed and cured layer is repeated, such that printed and cured layers are accumulated layer by layer to obtain a printed object P.

The 3D printing method of the present application adopts the 3D printing wires with the core-shell structures described in the first aspect and the second aspect, such that there is a strong bonding strength between different layers during printing and there is a significantly-stronger interlayer bonding strength than the core layer material used alone, which avoids the decline of an interlayer bonding strength of a composite filling wire and the significant weakening of interlayer bonding at a high filling content in the prior art.

The 3D printing method of the present application adopts the 3D printing wires with the core-shell structures described in the third aspect and the fourth aspect, such that a multi-layer structure of the 3D printing wire with the core-shell structure can be retained during a melt-extrusion printing process and a continuous phase morphological structure can be formed in a printed object, which can effectively improve the warpage in printing with a high-$T_g$ material while maintaining or even improving the interlayer bonding of a printed object.

The 3D printing method of the present application adopts the 3D printing wires with the core-shell structures described in the fifth aspect and the sixth aspect, which effectively improves the overall rigidity of the wire without reducing the surface hardness of the wire, namely, improving the overall rigidity of the wire. As a result, the extrusion conveyability of the soft elastomer material during a printing process is improved and the slippage of a fed wire is avoided, such that the convey of the wire by a printhead during 3D printing is smooth, which is conducive to improving a printing efficiency.

Figure 5:
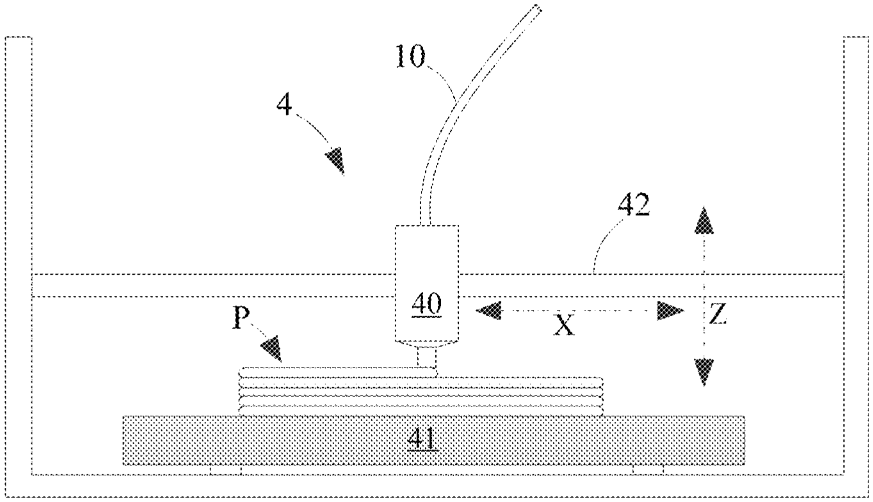
FIG. 5 is a schematic diagram of a 3D printing apparatus in an embodiment of the present application.

An eighth aspect of the present application provides a 3D printing apparatus. In an embodiment, the 3D printing apparatus is a 3D printing apparatus based on FDM, namely, an FDM apparatus. The 3D printing apparatus can control a printhead to lay a wire material layer by layer along a preset printing path during a printing work to obtain a printed object. FIG. 5 is a schematic diagram of the 3D printing apparatus in the embodiment of the present application. As shown in this figure, the 3D printing apparatus 4 includes printing platform 41, driving device 42, printhead device 40, and a control device (not shown in the figure).

The printing platform 41 is configured for attaching to a printed object P. In an embodiment, the printing platform 41 is arranged below an X-axis driving mechanism and a Y-axis driving mechanism, and is configured for attaching to the printed object P produced after stacking and molding.

The driving device 42 includes a Z-axis driving mechanism (not shown in the figure) that can rise and fall relative to the printing platform 41, and the X-axis driving mechanism and the Y-axis driving mechanism (not shown in the figure) that are arranged on the Z-axis driving mechanism.

The printhead device 40 is arranged on the X-axis driving mechanism or the Y-axis driving mechanism, and is configured to heat an introduced 3D printing wire to 150° C. to 400° C. for melting and then extrude a resulting melt to the printing platform 41 along a printing path, where the 3D printing wire 10 is the 3D printing wire described in the first aspect or the third aspect or the fifth aspect. In some embodiments, a printing temperature of the 3D printing wire is in a range of 150° C. to 400° C. The "printing temperature" refers to a temperature set for printing.

Preferably, the printing temperature of the 3D printing wire is in a range of 180° C. to 320° C. (such as 180° C. to 320° C., 190° C. to 320° C., 200° C. to 320° C., 210° C. to 320° C., 220° C. to 320° C., 230° C. to 320° C., 240° C. to 320° C., 250° C. to 320° C., 260° C. to 320° C., 270° C. to 320° C., 280° C. to 320° C., 290° C. to 320° C., 300° C. to 320° C., or 310° C. to 320° C.).

In some other embodiments, the printing temperature of the 3D printing wire is in a range of 200° C. to 260° C. (such as 200° C. to 260° C., 205° C. to 260° C., 210° C. to 260° C., 215° C. to 260° C., 220° C. to 260° C., 225° C. to 260° C., 230° C. to 260° C., 235° C. to 260° C., 240° C. to 260° C., 245° C. to 260° C., 250° C. to 260° C., or 255° C. to 260° C.).

The control device is electrically connected to the driving device 42 and the printhead device 40 and configured to control the driving device 42 and the printhead device 40 to implement a printing task of each layer along a printing path according to 3D printing data read, so as to allow layer-by-layer accumulation on the printing platform 41 to obtain a printed object P.

The 3D printing apparatus adopts the 3D printing wire with the core-shell structure described in the first aspect to print an object, such that there is a strong bonding strength between different layers during printing and there is a significantly-stronger interlayer bonding strength than the core layer material used alone, which avoids the decline of an interlayer bonding strength of a composite filling wire and the significant weakening of interlayer bonding at a high filling content in the prior art.

The 3D printing wires with the core-shell structures described in the third aspect and the fourth aspect are adopted during printing, such that a multi-layer structure of the 3D printing wire with the core-shell structure can be retained during a melt-extrusion printing process and a continuous phase morphological structure can be formed in a printed object, which can effectively improve the warpage in printing with a high-$T_g$ material while maintaining or even improving the interlayer bonding of a printed object.

The 3D printing wires with the core-shell structures described in the fifth aspect and the sixth aspect are adopted during printing, which effectively improves the overall rigidity of the wire without reducing the surface hardness of the wire, namely, improving the overall rigidity of the wire. As a result, the extrusion conveyability of the soft elastomer material during a printing process is improved and the slippage of a fed wire is avoided, such that the convey of the wire by a printhead during 3D printing is smooth, which is conducive to improving a printing efficiency.

In an embodiment shown in FIG. 5, the 3D printing apparatus further includes a framework (not numbered), and the framework is configured to carry or fix other devices.

In an embodiment, the control device includes a storage unit, a processing unit, and an interface unit. The storage unit includes a non-volatile memory, a volatile memory, or the like. The non-volatile memory is a solid-state disk or a U disk, for example. The storage unit is connected to the processing unit through a system bus. The processing unit includes at least one of a central processing unit (CPU) or a chip integrated with CPU, a programmable logic device (field programmable gate array (FPGA)), and a multi-core processor.

The interface unit includes a plurality of driving reserved interfaces, and each driving reserved interface is electrically connected to a device such as the printhead device 40 and the driving device 42 in the 3D printing apparatus that is independently encapsulated and transmits data or drives a work through the interface, so as to control the device such as the printhead device 40 and the driving device 42 in the 3D printing apparatus that is independently encapsulated and transmit data or drive a work through the interface. The control device further includes at least one of the following: a prompting unit, a human-computer interaction unit, or the like. An interface type of the interface unit is determined according to a connected device, including, but not limited to: a universal serial bus, a video interface, an industrial control interface, or the like. For example, the driving reserved interfaces include: a USB interface, an HDMI interface, and an RS232 interface. A plurality of USB interfaces and a plurality of RS232 interfaces are provided. The USB interface can be connected to the human-computer interaction unit or the like. The RS232 interface is connected to the printhead device, the driving device, or the like, so as to control the printhead device, the driving device, or the like.

In an embodiment, the printhead device 40 may further include: a material guide portion, a heating portion, and a printhead. The material guide portion includes a material guide pipe and a wire feeding gear, and is configured to convey a printing material provided by a wire feeding mechanism to the heating portion for heating. The heating portion is provided with a thermistor to detect a temperature, and is configured to arise a temperature to a melting point of a printing material (printing temperature range: 150° C. to 400° C.). A heat-molten printing material is spray-coated on the printing platform through the printhead.

The wire feeding mechanism refers to a mechanism configured to provide a 3D printing wire for the printhead device. In some cases, the wire feeding mechanism includes a storage structure configured to store a 3D printing wire, and an end of the 3D printing wire is placed in a wire inlet of the printhead device. A 3D printing wire can be continuously introduced and melted by the printhead device in a working state, and then output by the printhead.

In some other embodiments, the wire feeding mechanism further includes a material conveying/guiding device configured to guide a 3D printing wire to the wire inlet of the printhead device, and thus the 3D printing wire can be conveyed/guided to the wire inlet of the printhead device in a working state, such that the 3D printing wire enters the printhead device smoothly for melting.

The control device is configured to control the driving device and the printhead to work together to print an object according to slicing data of each layer of the printed object that is read. In some cases, the printing platform further includes a heating device. The printing platform can be heated by the heating device to provide a transitional environment for a molding process, so as to avoid a large internal stress produced after a molten wire is extruded and molded during a molding process due to a too-large difference between a melting temperature and a molding temperature, which is not conducive to the stability of a product structure and affects a product quality. Therefore, the heating device can provide a constant-temperature environment to control a temperature within an appropriate range, such that a material can be molded and a large internal stress can be avoided during a molding process, thereby improving a quality of molding and an accuracy of a printed object.

With the FDM printing apparatus based on FDM, various wires can be heated, melted, accumulated, and molded. Under the control of a computer, the heating printhead undergoes a plane movement along an X axis and a Y axis according to information of a cross-sectional profile of a product component. A thermoplastic wire material is sent by the wire feed mechanism to the hot-melting printhead, heated and melted into a semi-liquid state in the printhead, then extruded out, selectively coated on the platform based on control information of the computer, and rapidly cooled to form a sheet profile layer. After the one layer of cross-sectional molding is completed, the platform descends by a specified height along the Z axis, and then the next layer is formed, which is repeated to finally produce a 3D product component, namely, the printed object P shown in FIG. 5.

A ninth aspect of the present application provides a 3D-printed object, which refers to an object printed by the 3D printing method described in the third aspect.

The above embodiments merely illustrate the principles and effects of the present application, but are not intended to limit the present application. Any person skilled in the art can make modifications or alterations to the above embodiments without departing from the spirit and scope of the present application. Thus, all equivalent modifications or changes made by those of ordinary skill in the art without departing from the spirit and technical teachings disclosed in the present application should fall within the scope defined by appended claims of the present application.

What is claimed is:

1. A 3D printing wire, comprising: a core structure and a shell structure wrapped around the core structure, wherein the core structure comprises a first polymer matrix composite, the shell structure comprises a second polymer matrix composite, a starch filler material volume fraction of the first polymer matrix composite is higher than a starch filler material volume fraction of the second polymer matrix composite, and the filler material volume fraction of the second polymer matrix composite comprises 1 vol % to 20 vol %.

2. The 3D printing wire according to claim 1, wherein a volume fraction of the first polymer matrix composite in the 3D printing wire is in a range of 10% to 90%.

3. The 3D printing wire according to claim 1, wherein a difference between the starch filler material volume fraction of the first polymer matrix composite and the starch filler material volume fraction of the second polymer matrix composite is in a range of 1 vol % to 60 vol %.

4. The 3D printing wire according to claim 1, wherein the first polymer matrix composite or the second polymer matrix composite comprises a thermoplastic polymer matrix composite.

5. The 3D printing wire according to claim 1, wherein a matrix material of the first polymer matrix composite or the second polymer matrix composite comprises at least one selected from the group consisting of polyolefin, polyamide (PA), polyester, polycarbonate (PC), polyoxymethylene (POM), polyphenylene ether (PPE), polyphenylene sulfide (PPS), polyetheretherketone (PEEK), polysulfone (PSF), and a liquid crystal polymer (LCP).

6. The 3D printing wire according to claim 1, wherein the filler material volume fraction of the first polymer matrix composite comprises 3 vol % to 60 vol %.

7. The 3D printing wire according to claim 1, wherein the filler material volume fraction of the first polymer matrix composite comprises 10 vol % to 40 vol %.

8. The 3D printing wire according to claim 1, wherein the filler material volume fraction of the first polymer matrix composite comprises 15 vol % to 30 vol %.

9. The 3D printing wire according to claim 1, wherein a first starch filler material of the first polymer matrix composite and a second starch filler material of the second polymer matrix composite are same or different.

10. The 3D printing wire according to claim 1, wherein the starch filler material of the first polymer matrix composite or the second polymer matrix composite is in at least one selected from the group consisting of a powder form, a granular form, a fibrous form, and a sheet form.

11. The 3D printing wire according to claim 1, wherein an average diameter of the 3D printing wire is 1.55 mm to 3.15 mm.

12. The 3D printing wire according to claim 1, wherein a printing temperature of the 3D printing wire is in a range of 150° C. to 400° C.

13. A 3D printing method used for a 3D printing apparatus, comprising the following steps:

reading printing data, wherein the printing data comprises a data command corresponding to at least one cross-sectional layer;

controlling a printhead device of the 3D printing apparatus to heat a 3D printing wire to 150° C. to 400° C. and extrude the 3D printing wire to a printing surface along a printing path according to the cross-sectional layer to obtain a printed and cured layer, wherein the 3D printing wire is the 3D printing wire according to claim 1; and according to a number of the cross-sectional layers, repeating the step of controlling the printhead device to extrude the printing material to the printing surface along the printing path according to the cross-sectional layer to obtain the printed and cured layer, wherein printed and cured layers are accumulated layer by layer to obtain a printed object.

14. The 3D printing wire according to claim 1, wherein the starch filler material of the first polymer matrix composite or the second polymer matrix composite is in at least one selected from the group consisting of a powder form, a granular form, a fibrous form, and a sheet form.

15. The 3D printing method according to claim 13, wherein in the 3D printing wire, a volume fraction of the first polymer matrix composite in the 3D printing wire is in a range of 10% to 90%.

16. The 3D printing method according to claim 13, wherein in the 3D printing wire, a difference between the starch filler material volume fraction of the first polymer matrix composite and the starch filler material volume fraction of the second polymer matrix composite is in a range of 1 vol % to 60 vol %.

* * * * *